US007325054B2

(12) United States Patent
Ishimoto

(10) Patent No.: US 7,325,054 B2
(45) Date of Patent: Jan. 29, 2008

(54) SYSTEM FOR NOTIFYING DESTINATION USER WHEN STATUS OF CONSUMABLE PRODUCTS OF PRINTING DEVICES MEETS USER SELECTED NOTIFICATION CONDITION

(75) Inventor: Kan Ishimoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 822 days.

(21) Appl. No.: 10/452,119

(22) Filed: Jun. 3, 2003

(65) Prior Publication Data

US 2003/0229691 A1    Dec. 11, 2003

(30) Foreign Application Priority Data

Jun. 7, 2002    (JP) ............................. 2002-167065

(51) Int. Cl.
 *G06F 15/173* (2006.01)
(52) U.S. Cl. .................. 709/224; 709/223; 710/15; 710/19
(58) Field of Classification Search ................ 709/223, 709/224, 220, 206; 707/104.1; 714/43; 358/1.15; 235/379; 710/15, 19
See application file for complete search history.

(56) References Cited

U.S. PATENT DOCUMENTS

| | | | | |
|---|---|---|---|---|
| 5,984,178 | A * | 11/1999 | Gill et al. .................. | 235/379 |
| 6,430,711 | B1 | 8/2002 | Sekizawa | |
| 6,556,659 | B1 * | 4/2003 | Bowman-Amuah ........ | 379/9.04 |
| 6,557,007 | B1 * | 4/2003 | Pekowski et al. ........ | 707/104.1 |
| 6,604,212 | B2 | 8/2003 | Sekizawa | |
| 6,681,349 | B2 | 1/2004 | Sekizawa | |
| 6,832,341 | B1 * | 12/2004 | Vijayan ....................... | 714/43 |
| 6,947,156 | B1 * | 9/2005 | Jeyachandran et al. .... | 358/1.15 |
| 7,095,518 | B1 * | 8/2006 | Keeney et al. ............. | 358/1.15 |
| 2002/0101604 | A1 * | 8/2002 | Mima et al. ................ | 358/1.15 |
| 2002/0116480 | A1 * | 8/2002 | Muto .......................... | 709/220 |
| 2002/0120699 | A1 * | 8/2002 | Wakabayashi .............. | 709/206 |
| 2002/0135807 | A1 * | 9/2002 | Idehara ...................... | 358/1.15 |
| 2003/0002074 | A1 * | 1/2003 | Miyano ..................... | 358/1.15 |
| 2004/0098480 | A1 | 5/2004 | Sekizawa | |

FOREIGN PATENT DOCUMENTS

| | | |
|---|---|---|
| JP | A-07-24889 | 9/1995 |
| JP | A-08-070489 | 3/1996 |
| JP | A-08-221234 | 8/1996 |
| JP | A 11-306115 | 5/1999 |
| JP | A-11-353145 | 12/1999 |
| JP | A 2000-69216 | 3/2000 |
| JP | A 2000-194626 | 7/2000 |
| JP | A-2002-091507 | 3/2002 |

* cited by examiner

*Primary Examiner*—Le Hien Luu
(74) *Attorney, Agent, or Firm*—Oliff & Berridge, PLC

(57) ABSTRACT

A network is configured of networks connected to each other via a router. A notification terminal device, a plurality of printers serving as the network terminal devices, a plurality of personal computers serving as the notifying terminal devices, and the like are connected to the network. The notification terminal device establishes groups of printers and, for each group, sets mail addresses and conditions for issuing notifications to those mail addresses regarding the status of the printers. The notification terminal device collects status data from the printers and transmits notification mail to the preset mail addresses based on the notification conditions set for each group.

17 Claims, 20 Drawing Sheets

NOTIFICATIONS SETTINGS LIST

| NOTIFICATION SETTING NUMBER | CONTENTS |||||||
|---|---|---|---|---|---|---|---|
| | NOTIFICATION SETTING NAME | DESTINATION MAIL ADDRESS | PRINTER CONDITION (NODE ADDRESS) | NOTIFICATION CONDITION ||||
| | | | | NO. | STATUS | INTERVAL | TIMES |
| 1 | ALL | allkanri@aaaaa.co.jp | 10.134.*.* 10.135.*.* | 1 | Cover Open | 20 | Every Time |
| | | | | 2 | Jam | 1 | Every Time |
| | | | | 3 | Toner Low | 0 | Only Once |
| | | | | 4 | Toner Empty | 0 | Only Once |
| | | | | 5 | User consumable warning | 0 | Only Once |
| | | | | 6 | User consumable error | 0 | Only Once |
| | | | | 7 | Change Drum | 0 | Only Once |
| | | | | 8 | Memory Error | 0 | Only Once |
| | | | | 9 | Input Media Error | 0 | Only Once |
| 2 | Floor1 | floor1kanri@aaaaa.co.jp | 10.134.*.* | 1 | Cover Open | 5 | Every Time |
| | | | | 2 | Jam | 3 | Every Time |
| 3 | Floor2 | floor2kanri@aaaaa.co.jp | 10.135.*.* | 1 | Cover Open | 10 | Every Time |
| | | | | 2 | Toner Empty | 0 | Only Once |
| | | | | 3 | Jam | 5 | Every Time |

| PRINTER NAME | NODE ADDRESS | LOCATION |
|---|---|---|
| PRINTER a | 10. 135. 23. 45 | 2F |
| PRINTER b | 10. 135. 23. 46 | 2F |
| PRINTER c | 10. 135. 23. 47 | 2F |
| PRINTER d | 10. 135. 23. 48 | 2F |
| PRINTER e | 10. 134. 11. 21 | 1F |
| PRINTER f | 10. 134. 11. 22 | 1F |
| PRINTER g | 10. 134. 11. 23 | 1F |
| PRINTER h | 10. 134. 11. 24 | 1F |
| PRINTER i | 10. 136. 33. 61 | 3F |
| PRINTER j | 10. 136. 33. 62 | 3F |

FIG.9

Notification Setting 1 \ 2 \ 3       200

| | | | |
|---|---|---|---|
| Name of Notification Setting | ALL | | |
| Mail Address | allkanri@aaaaa.co.jp | | |

| | | | |
|---|---|---|---|
| ☑ Cover Open | 20 | minutes | every time ▼ |
| ☑ Jam | 1 | minutes | every time ▼ |
| ☑ Toner Low | 0 | minutes | only once ▼ |
| ☑ Toner Empty | 0 | minutes | only once ▼ |
| ☑ User consumable warning | 0 | minutes | only once ▼ |
| ☑ User consumable error | 0 | minutes | only once ▼ |
| ☐ Serviceman consumable warning | | minutes | ▼ |
| ☐ Serviceman consumable error | | minutes | ▼ |
| ☑ Change Drum | 0 | minutes | only once ▼ |
| ☑ Memory Error | 0 | minutes | only once ▼ |
| ☑ Input Media Error | 0 | minutes | only once ▼ |
| ☐ Output full | | minutes | ▼ |
| ☐ Not Installed | | minutes | ▼ |
| ☐ Machine Error | | minutes | ▼ |
| ☐ Other Errors | | minutes | ▼ |

Filter
Node Address     | 10. 134. *. * , 10. 135. *. * |

[ Cancel ]  [ Submit ]

FIG.10

NOTIFICATIONS SETTINGS LIST

| NOTIFICATION SETTING NUMBER | CONTENTS ||||||
|---|---|---|---|---|---|---|
| | NOTIFICATION SETTING NAME | DESTINATION MAIL ADDRESS | PRINTER CONDITION (NODE ADDRESS) | NOTIFICATION CONDITION |||
| | | | | NO. | STATUS | INTERVAL | TIMES |
| 1 | ALL | allkanri@aaaaa.co.jp | 10.134.*.*<br>10.135.*.* | 1 | Cover Open | 20 | Every Time |
| | | | | 2 | Jam | 1 | Every Time |
| | | | | 3 | Toner Low | 0 | Only Once |
| | | | | 4 | Toner Empty | 0 | Only Once |
| | | | | 5 | User consumable warning | 0 | Only Once |
| | | | | 6 | User consumable error | 0 | Only Once |
| | | | | 7 | Change Drum | 0 | Only Once |
| | | | | 8 | Memory Error | 0 | Only Once |
| | | | | 9 | Input Media Error | 0 | Only Once |
| 2 | Floor1 | floor1kanri@aaaaa.co.jp | 10.134.*.* | 1 | Cover Open | 5 | Every Time |
| | | | | 2 | Jam | 3 | Every Time |
| 3 | Floor2 | floor2kanri@aaaaa.co.jp | 10.135.*.* | 1 | Cover Open | 10 | Every Time |
| | | | | 2 | Toner Empty | 0 | Only Once |
| | | | | 3 | Jam | 5 | Every Time |

FIG.11

PRINTER LIST

| NO. | NODE ADDRESS | STATUS | INFORMATION OF CONSUMABLES | |
|---|---|---|---|---|
| | | | COUNT OF PRINTING | AMOUNT OF TONER REMAINING |
| 1 | 10.134.11.21 | Jam / Toner low | 25161 | 10% |
| 2 | 10.134.11.22 | Normal | 18524 | 20% |
| 3 | 10.134.11.23 | Toner low | 23590 | 10% |
| 4 | 10.134.11.24 | Normal | 1321 | 80% |
| 5 | 10.135.23.45 | Normal | 8412 | 60% |
| 6 | 10.135.23.46 | Cover Open | 18211 | 30% |
| 7 | 10.135.23.47 | Normal | 16788 | 30% |
| 8 | 10.135.23.48 | Change Drum | 30002 | 20% |
| 9 | 10.136.33.61 | Normal | 4010 | 80% |
| 10 | 10.136.33.62 | Normal | 2252 | 90% |

FIG.12

RECENT DATA LIST

| NUMBER OF NORTIFICATION SETTING | TARGET NO. | NODE ADDRESS | STATUS | INFORMATION OF CONSUMABLES | |
|---|---|---|---|---|---|
| | | | | COUNT OF PRINTING | AMOUNT OF TONER REMAINING |
| 1 | 1 | 10.134.11.21 | Jam | 25161 | 10% |
| | | | Toner low | | |
| | 2 | 10.134.11.22 | Normal | 18524 | 20% |
| | 3 | 10.134.11.23 | Toner low | 23590 | 10% |
| | 4 | 10.134.11.24 | Normal | 1321 | 80% |
| | 5 | 10.135.23.45 | Normal | 8412 | 60% |
| | 6 | 10.135.23.46 | Cover Open | 18211 | 30% |
| | 7 | 10.135.23.47 | Normal | 16788 | 30% |
| | 8 | 10.135.23.48 | Change Drum | 30002 | 20% |
| 2 | 1 | 10.134.11.21 | Jam | 25161 | 10% |
| | | | Toner low | | |
| | 2 | 10.134.11.22 | Normal | 185214 | 20% |
| | 3 | 10.134.11.23 | Toner low | 23590 | 10% |
| | 4 | 10.134.11.24 | Normal | 1321 | 80% |
| 3 | 1 | 10.135.23.45 | Normal | 8412 | 60% |
| | 2 | 10.135.23.46 | Cover Open | 18211 | 30% |
| | 3 | 10.135.23.47 | Normal | 16788 | 30% |
| | 4 | 10.135.23.48 | Change Drum | 30002 | 20% |

FIG.13

| NUMBER OF NOTIFICATION SETTING | TARGET NO. | NODE ADDRESS | STATUS | TIME OF OCCURRENCE | INFORMATION OF CONSUMABLES | |
|---|---|---|---|---|---|---|
| | | | | | COUNT OF PRINTING | AMOUNT OF TONER REMAINING |
| 1 | 1 | 10.134.11.21 | Jam | 10:35 | 25161 | 10% |
| | | | Toner low | 18:30 | | 20% |
| | 2 | 10.134.11.22 | Normal | | 18521 | 10% |
| | 3 | 10.134.11.23 | Toner low | 09:56 | 23587 | 80% |
| | 4 | 10.134.11.24 | Normal | | 1321 | 60% |
| | 5 | 10.135.23.45 | Normal | | 8412 | |
| | 6 | 10.135.23.46 | Change Drum | 10:16 | 18211 | 30% |
| | | | Cover Open | 10:30 | | |
| | 7 | 10.135.23.47 | Normal | | 16788 | 30% |
| | 8 | 10.135.23.48 | Normal | | 29994 | 20% |
| 2 | 1 | 10.134.11.21 | Jam | 10:35 | 25161 | 10% |
| | | | Toner low | 08:35 | | 20% |
| | 2 | 10.134.11.22 | Normal | | 18521 | 10% |
| | 3 | 10.134.11.23 | Toner low | 09:56 | 23587 | 80% |
| | 4 | 10.134.11.24 | Normal | | 1321 | 60% |
| 3 | 1 | 10.135.23.45 | Normal | | 8412 | 30% |
| | 6 | 10.135.23.46 | Cover Open | 10:30 | 18211 | 30% |
| | 3 | 10.135.23.47 | Normal | | 16788 | 20% |
| | 4 | 10.135.23.48 | Normal | | 29994 | |

PREVIOUS DATA LIST

FIG.14

ERROR OCCURRENCE NOTIFICATION MAIL LIST

| NO. | ERROR TYPE | PRINTER INFORMATION |
|---|---|---|
| 1 | Jam | 10. 134. 11. 21 |
| 2 | Cover Open | 10. 135. 23. 46 |
| 3 | Change Drum | 10. 135. 23. 48 |

FIG.15

ERROR RECOVERY NOTIFICATION MAIL LIST

| NO. | ERROR TYPE | PRINTER INFORMATION |
|---|---|---|
| 1 | Change Drum | 10. 135. 23. 46 |

FIG.16

Error Occurred [ Jam ]
IP Address : 10. 134. 11. 21

--------------------------------------------

Error Occurred [ Cover Open ]
IP Address : 10. 135. 23. 46

--------------------------------------------

Error Occurred [ Change Drum ]
IP Address : 10. 135. 23. 48

SYSTEM FOR NOTIFYING DESTINATION USER WHEN STATUS OF CONSUMABLE PRODUCTS OF PRINTING DEVICES MEETS USER SELECTED NOTIFICATION CONDITION

BACKGROUND OF THE INVENTION

1. Field of the Invention

The present invention relates to a status notifying system and particularly to a status notifying system including a notification terminal device for notifying a notifying terminal device about status of network terminal devices connected to the notification device via a network.

2. Related Art

Network terminal devices such as printers having a status notifying function are well known in the art. When an error occurs in a printer having this function, the printer can notify a person in charge regarding details of is the error based on preset conditions. The person in charge to be the target of notification is set for each printer.

However, a network administrator must perform the settings for each printer. Hence, such settings can become quite a burden on the network administrator when initially constructing the network or when adding a printer to an existing network.

SUMMARY OF THE INVENTION

In view of the foregoing, it is an object of the present invention to provide a status notifying system and a notification terminal device for notifying a user via a notifying terminal device about the status of a plurality of network terminal devices connected together via a network, without burdening the network administrator.

In order to attain the above and other objects, the present invention provides a notifying system including a plurality of network terminals and a notification terminal that is connected to the network terminals via a network. Each of the network terminals includes a status transmitting unit that transmits status data to the notification terminal, the status data indicating a status of the network terminal. The notification terminal includes a receiving unit that receives the status data, a setting unit that sets a notification condition and a destination user, a determining unit that determines whether the status of the network terminal meets the notification condition, and a notifying unit that notifies the destination user of the status when the determining unit determines that the status meets the notification condition.

There is also provided a notification terminal connected to a plurality of network terminals and a user terminal via a network. The notification terminal includes a receiving unit that receives status data indicating status of the network terminals from the network terminals, a setting unit that sets a notification condition and a destination user, a determining unit that determines whether the status meets the notification condition, and a notifying unit that notifies the destination user of the status when the determining unit determines that the status meets the notification condition.

BRIEF DESCRIPTION OF THE DRAWINGS

In the drawings:

FIG. 9 is a Notification Setting window for setting conditions for issuing notifications regarding the occurrence and recovery of errors in the printers;

FIG. 10 is an explanatory diagram showing a notification settings list;

FIG. 11 is an explanatory diagram showing a printer list;

FIG. 12 is an explanatory diagram showing a recent data list;

FIG. 13 is an explanatory diagram showing a previous data list;

FIG. 14 is an explanatory diagram showing an error occurrence notification mail list;

FIG. 15 is an explanatory diagram showing an error recovery notification mail list;

FIG. 16 is an example of text used in an error occurrence notification mail;

PREFERRED EMBODIMENTS OF THE PRESENT INVENTION

Figure 1:
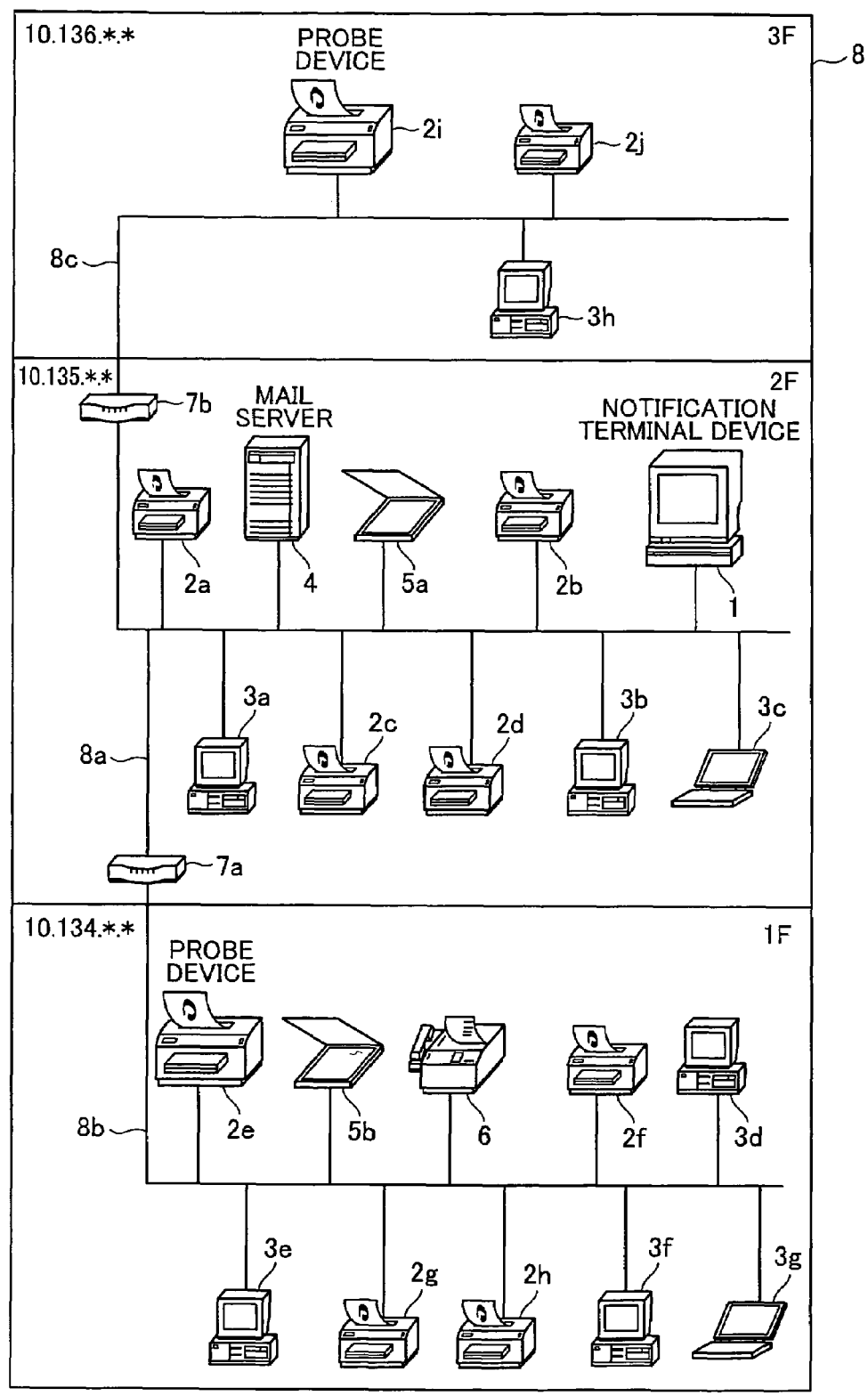
FIG. 1 is an explanatory diagram showing the construction of a network to which the network terminal device status notifying system of the present embodiment has been applied.

A network terminal device status notifying system according to an embodiment of the present invention will be described while referring to the accompanying drawings. FIG. 1 is an explanatory diagram showing the construction of a local area network (LAN) to which the network terminal device status notifying system of the present embodiment has been applied. The network terminal device status notifying system of the present embodiment relates to a communication network, such as a network 8 shown in FIG. 1, in which a plurality of networks 8a to 8c are interconnected via routers 7a and 7b.

As shown in FIG. 1, the network 8 of the present embodiment includes the networks 8a, 8b, 8c provided on different floors of a building that are connected to each other via the routers 7a and 7b. Various network terminal devices are connected to the networks 8a, 8b, 8c on the floors (the first, second, and third floors in FIG. 1) and include printers 2a-2j, personal computers 3a-3h, scanners 5a and 5b, a facsimile device 6, and the like. Further, a notification terminal device 1 is connected to the network 8a for issuing a notification regarding the status of the network terminal devices 2-6 on the network 8. The printers 2e and 2i connected to the networks 8b and 8c, respectively, serve as probing devices for assisting the management of the network terminal devices 2-6. In this embodiment, the printers 2 are considered network terminal devices and the personal computers 3 are considered notifying terminal devices. Further, a mail server 4 is connected to the network 8a. In the present embodiment, electronic mail outputted from the notification terminal device 1 accumulates in the mail server 4. The contents of the electronic mail are reported (displayed) to the personal computer 3 when the personal computer 3 accesses the mail server 4.

Figures 2, 3:
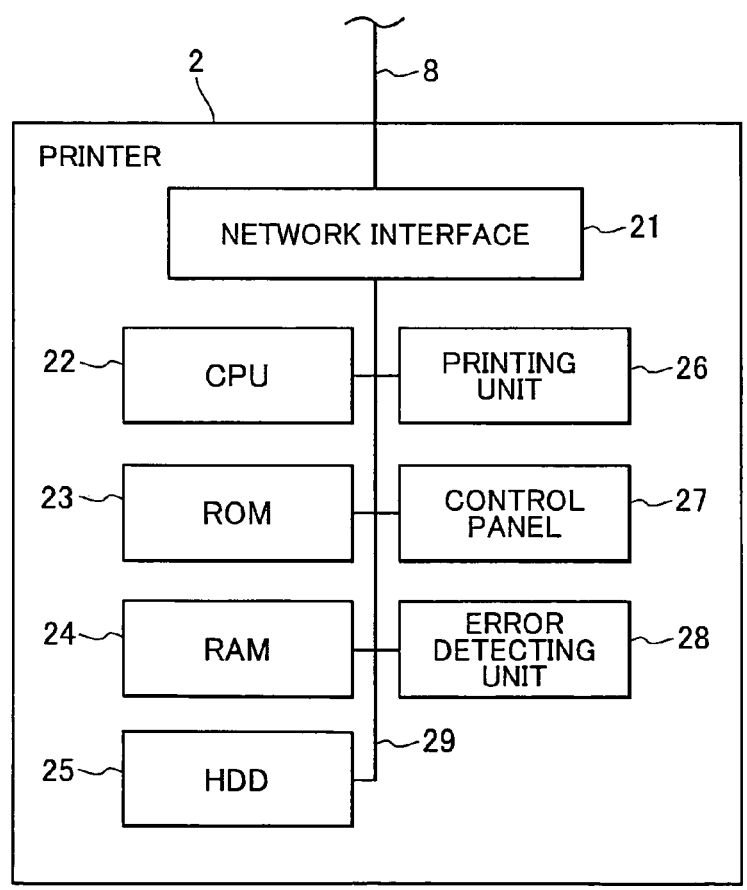
FIG. 2 is a table listing printers connected to the network of FIG. 1.
FIG. 3 is a block diagram showing construction of a printer.

FIG. 2 shows a list of the printers 2 connected to the network 8. As shown in FIG. 1, ten printers 2a-2j are connected to the network 8. As shown in FIG. 2, the printer 2a has the node address "10.135.23.45" and is located on the second floor; the printer 2b has the node address "10.135.23.46" and is located on the second floor; the printer 2c has the node address "10.135.23.47" and is located on the second floor; the printer 2d has the node address "10.135,23.48" and is located on the second floor; the printer 2e has the node address "10.134.11.21" and is located on the first floor; the printer 2f has the node address "10.134.11.22" and is located on the first floor; the printer 2g has the node address "10.134.11.23" and is located on the first floor; the printer 2h has the node address "10.134.11.24" and is located on the first floor; the printer 2i has the node address "10.136.33.61" and is located on the third floor; and the printer 2j has the node address "10.136.33.62" and is located on the third floor. Hence, the node address for each printer located on the first floor can be specified by "10.134.*.*", wherein the "*" denotes a wildcard. Similarly, the node address for each printer located on the second floor can be specified by "10.135.*.*", and the node address for each printer located on the third floor can be specified by "10.136.*.*".

Next, the construction of each of the printers 2 will be described with reference to FIG. 3. Each printer 2 includes a network interface 21, a central processing unit (CPU) 22, a read only memory (ROM) 23, a random access memory (RAM) 24, a hard disk drive (HDD) 25, a printing unit 26, a control panel 27, an error detecting unit 28, and the like. The network interface 21 transmits and receives data via the network 8 and monitors packets being transmitted over the network 8. The ROM 23 is nonvolatile memory storing various control programs and firmware for controlling the printers 2. The RAM 24 is volatile memory for temporarily storing the results of processing various data. The hard disk drive 25 is a storage medium for storing various control programs. The printing unit 26 prints data received by the network interface 21. The control panel 27 enables a user to input selected operations and displays various data. The error detecting unit 28 detects when an error occurs in the printer 2 and when the printer 2 has been restored. All of these components are connected via a bus 29. The CPU 22 manages all components of the printer 2.

Of the printers 2 connected to the network 8, the printers 2e and 2i function as probe devices for monitoring request data from the notification terminal device 1 and to assist in the management of the networks 8b and 8c, respectively.

Figure 4:
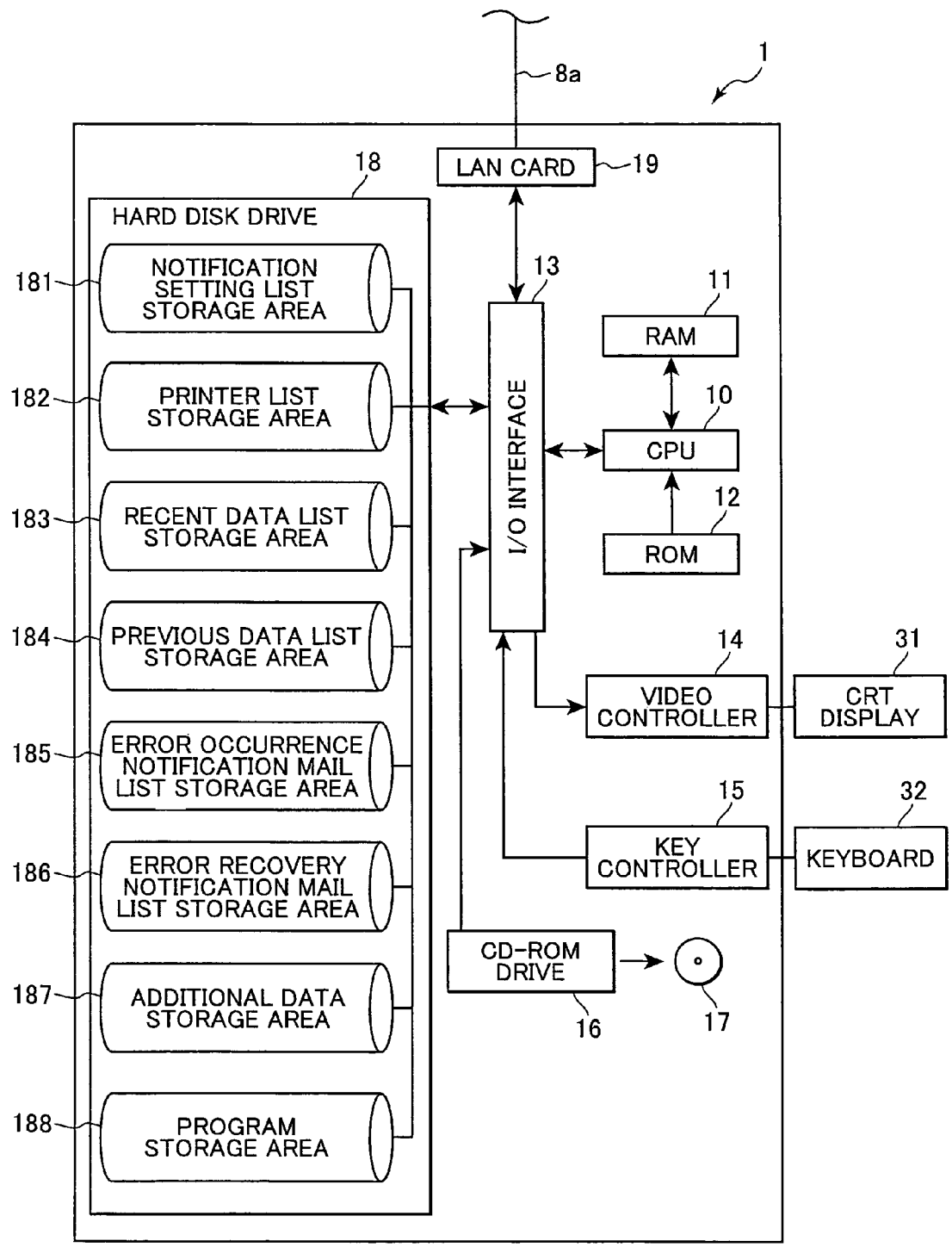
FIG. 4 is a block diagram showing the construction of a notification terminal device according to the present embodiment.

Next, the construction of the notification terminal device 1 will be described with reference to FIG. 4. As shown in FIG. 4, the notification terminal device 1 includes a CPU 10 connected to a RAM 11, a ROM 12, and an input/output (I/O) interface 13. The CPU 10 is for executing control in the notification terminal device 1. The RAM 11 is for temporarily storing various data. The ROM 12 is for storing BIOS and other data. The input/output interface 13 serves as an interface to transfer data. The notification terminal device 1 further includes a hard disk drive 18, a video controller 14, a key controller 15, a CD-ROM drive 16, and a LAN card 19, all of which are connected to the I/O interface 13. The LAN card 19 can be connected to the network 8a. A CRT display 31 is connected to the video controller 14, and a keyboard 32 is connected to the key controller 15.

The hard disk drive 18 includes a notification settings list storage area 181 for storing a notification settings list listing notification destinations and printer conditions, a printer list storage area 182 for storing a printer list listing all of the printers 2 connected to the network 8, a recent data list storage area 183 for storing a recent data list listing the status of the printers 2 for each notification setting, a previous data list storage area 184 for storing a previous data list that is updated in a status notification process, an error occurrence notification mail list storage area 185 for storing data to be used in error notification mail, an error recovery notification mail list storage area 186 for storing data to be used in recovery notification mail, an additional data storage area 187, and a program storage area 188 storing programs executed by the CPU 10.

When a CD-ROM 17 storing control programs for the notification terminal device 1 is inserted into the CD-ROM drive 16, the control programs are transferred from the CD-ROM 17 and stored in the program storage area 188 of the hard disk drive 18.

Figure 5:
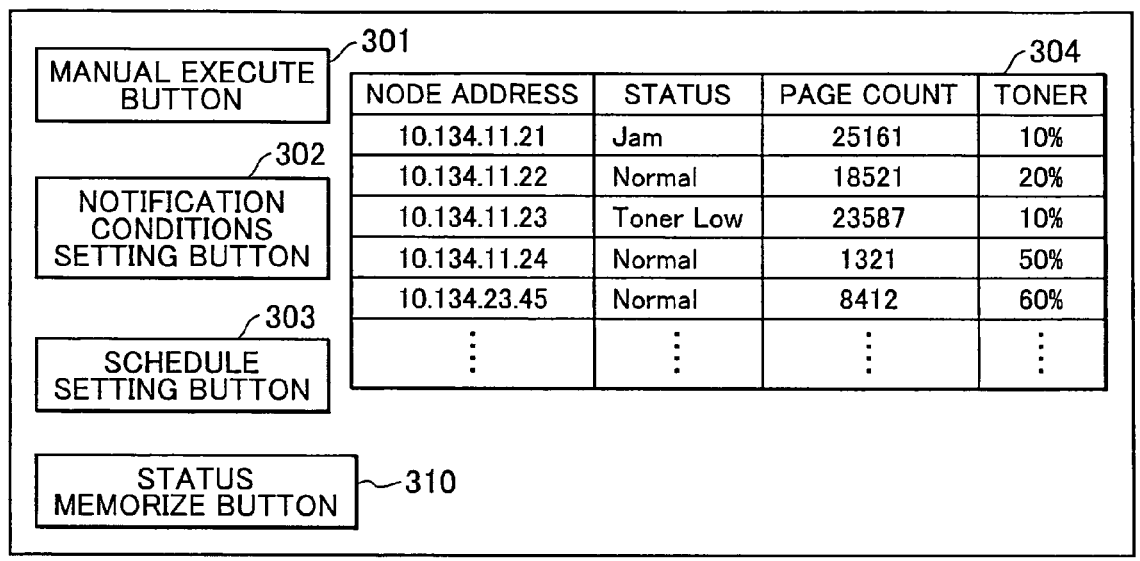
FIG. 5 is a main window displayed on the notification terminal device.
Figure 6:
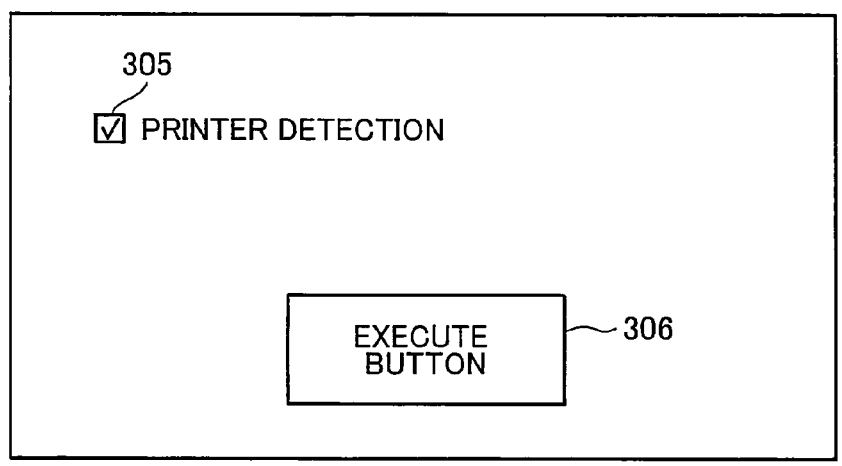
FIG. 6 is a Manual Execution window displayed on the notification terminal device.

Next, a method for entering status notification settings data will be described with reference to FIGS. 5 through 9. When the notification settings software program is started, a main window such as that shown in FIG. 5 is displayed. The main window includes a Manual Execute button 301, a Notification Conditions Setting button, 302, a Schedule Setting button 303, and a table 304 listing printers 2 based on the printer list. When the user presses the Manual Execute button 301, a Manual Execute window shown in FIG. 6 is displayed. By pressing an Execute button 306, it is possible to execute a status notification process (described later) at any time. By pressing the Schedule Setting button 303 in the main window, a Schedule Settings window shown in FIG. 8 is displayed. Here, the user can set a scheduled time for executing the status notification process and a printer detection process (described later).

Figure 7:
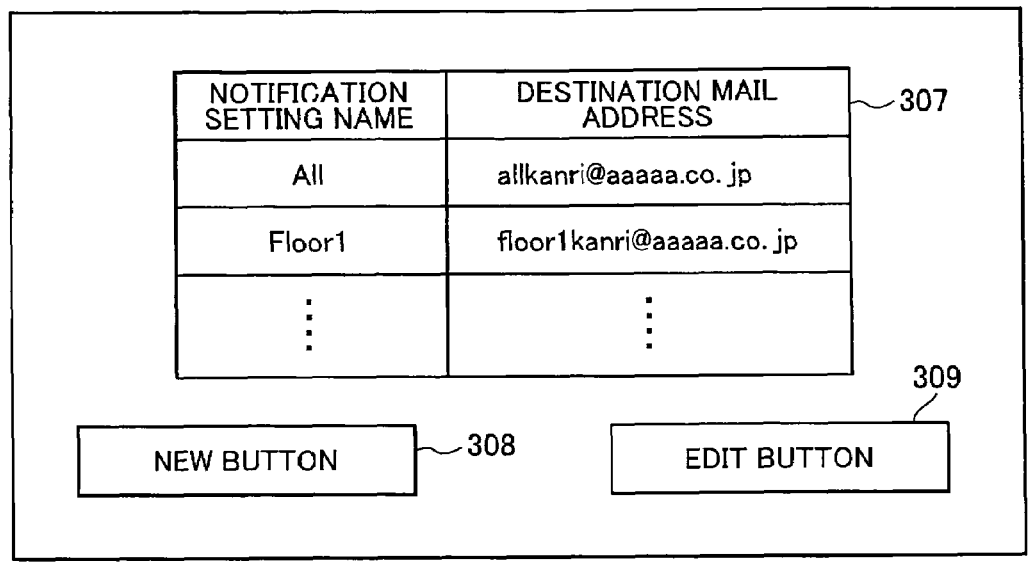
FIG. 7 is a notification conditions setting window displayed on the notification terminal device.
Figure 8:
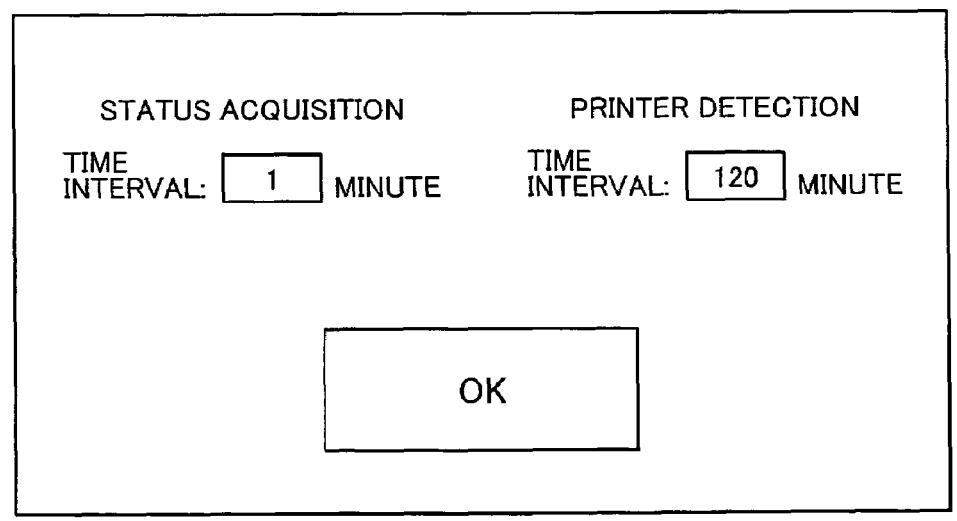
FIG. 8 is a Schedule Setting window displayed on the notification terminal device.
Figure 17:
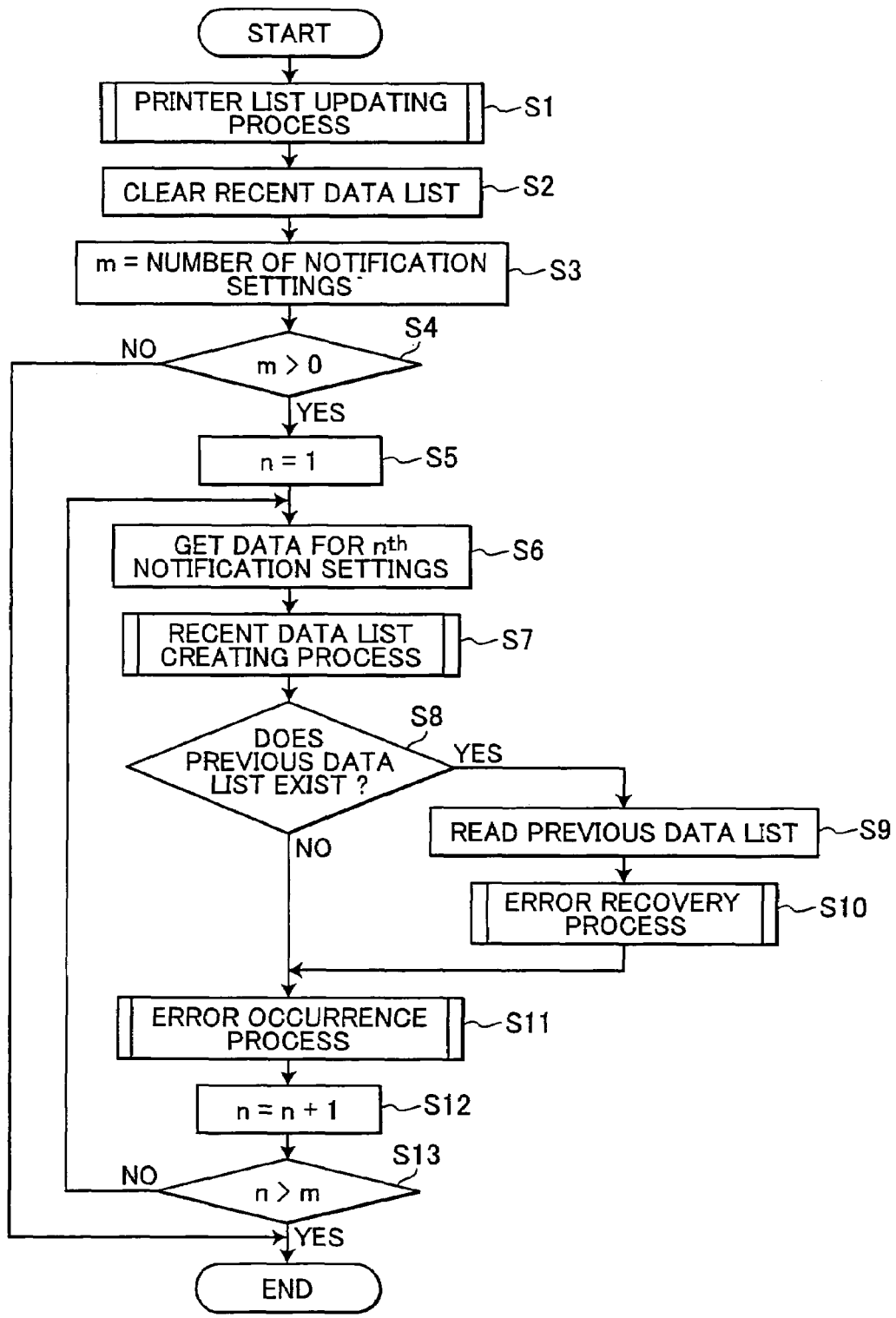
FIG. 17 is a flowchart representing a status notification process.

When the Notification Conditions Setting button 302 is pressed, a Notification Conditions Setting window shown in FIG. 7 is displayed. This window includes a table 307 listing the names of current notification settings and their corresponding mail addresses serving as the destination for notifications. By selecting either a New button 308 or an Edit button 309, the user can create a new notification setting or edit an existing one. By pressing either the New button 308 or the Edit button 309, a Notification Settings window 200 shown in FIG. 9 is displayed. In the Notification Settings window 200, the user can set conditions and the like for each notification setting in order to notify the printer administrator of the printers status when an error occurs in the printers or when an error is cleared. Specifically, the user can set a name for the notification setting, a mail address, types of errors that trigger a notification, frequency of notifications, and a filter for determining which printers to monitor. Here, the node address of the printer is used for the filter.

In the example of FIG. 9, under the Notification setting 1 named "ALL," a notification mail concerning printers having the node addresses "10.134.*.*" or "10.135.*.*" is transmitted to the address "allkanri@aaaaa.co.jp." Boxes next to the various error types, such as "Cover Open" and "Jam", can be checked to select whether a notification is issued when such an error occurs. When a box is checked, the user can also set the interval between notifications and the notification frequency ("only once" or "every time"). If the notification frequency is set to "every time," then notifications are issued repeatedly at the set interval until the printer has been restored. If the notification frequency is set to "only once," the notification is issued one time when the error occurs. In the example of FIG. 9, the "Cover Open" error is set to an interval of twenty minutes and a frequency of "every time." Accordingly, a "Cover Open" notification is issued every twenty minutes beginning 20 minutes after the "Cover Open" status is detected until the printer is restored. For example, if a "Cover Open" status is detected at 10:30, a notification of the error occurrence is not issued to the specified mail address until 20 minutes after this time, that is, 10:50. Further, a notification is not issued to the mail address if the "Cover Open" error is cleared prior to 10:50. A notification is issued at twenty-minute intervals, provided the "Cover Open" status has not been cleared. Here, the "Cover Open" status is only notified of after the cover has been left open for a long period of time (twenty minutes in this case) because the user would be annoyed to be notified each time the printer cover were opened. In cases where mistaken detections can easily occur, it is effective to establish settings in which notifications are issued only when the error has been detected continuously over a fixed interval.

"Jam" is set to a notification interval of one minute and a frequency of "every time." Accordingly, a "Jam" notification is issued every minute beginning one minute after the error occurs until the printer is restored. "Toner Low," "Toner Empty," "User Consumable Warning," "User Consumable Error," "Change Drum," "Memory Error," and "Input Media Error" are all set to an interval of 0 minutes with a notification frequency of "only once." Accordingly, a notification is issued only one time when these errors occur. According to the settings in FIG. 9, notifications are not issued on the occurrence of a "Serviceman Consumable Warning," "Serviceman Consumable Error," "Output Full," "Not Installed," "Machine Error," and "Other Error."

Next, the notification settings list stored in the notification settings list storage area 181 will be described with reference to FIG. 10. The notification settings list stores details of entries made in the Notification Settings window 200. The notification terminal device 1 performs a status notification process for one or more of the printers 2 connected to the network 8 based on this notification settings list.

As shown in the example of FIG. 10, the Notification Setting 1 is named "ALL." When a "Cover Open" error occurs in one of the printers 2 having the node address "10.134.*.*" or "10.135.*.*," the settings indicate that notification mail is to be sent to the mail address "allkanri@aaaaa.co.jp" at twenty-minute intervals beginning 20 minutes after the error occurs until the printer is restored. When a "Jam" error occurs, notification mail is issued to the same address each minute beginning one minute after the error occurs until the printer is restored. Notification mail is sent to the address one time on the occurrence of a "Toner Low," "Toner Empty," "User Consumable warning," "User Consumable Error," "Change Drum," "Memory Error," and "Input Media Error."

"Floor1" is the notification setting name for Notification Setting 2. When a "Cover Open" error occurs in a printer having the node address "10.134.*.*," the settings indicate that notification mail is to be transmitted to the mail address "floor1kanri@aaaaa.co.jp" every five minutes beginning five minutes after the error occurs until the printer is restored. When a "Jam" occurs, notification mail is sent to the same address every three minutes beginning three minutes after the error occurs until the printer is restored.

Further, "Floor2" is the notification settings name for Notification Setting 3. When a "Cover Open" error occurs in a printer having the node address "10.135.*.*," these settings indicate that notification mail is to be transmitted to the mail address "floor2kanri@aaaaa.co.jp" every ten minutes beginning ten minutes after the error occurs until the printer is restored. When a "Toner Empty" error occurs, notification mail is transmitted to the same address only one time when the error occurs. When a "Jam" error occurs, notification mail is sent to the same address every five minutes beginning five minutes after the error occurs until the printer is restored.

Next, the printer list stored in the printer list storage area 182 will be described with reference to FIG. 11. The printer list is a list of all printers 2 on the network 8 and is updated in a printer list updating process (described later). The printer list stores node addresses of the printers 2, the status of the printers 2, and the total number of printed pages (count of printing) and the remaining amount of toner as consumable product data. In the example of FIG. 11, the node address for printer No. 1 is "10.134.11.21," the status is "Jam" and "Toner Low," the total number of printed pages is 25,161, and the remaining toner is 10%. For printer No. 2, the node address. is "10.134.11.22," the status is "Normal," the total number of printed pages is 18,524, and the remaining toner is 20%.

Next, the recent data list stored in the recent data list storage area 183 will be described with reference to FIG. 12. Each time the notification terminal device 1 performs the status notification process, recent data on the printers 2 meeting the printer condition for each notification setting is entered in the recent data list. For example, referring back to FIG. 10, the printer condition for Notification Setting 1 is "10.134.*.*" and "10.135.*.*." By referring to the printer list of FIG. 11, we can see there ate eight printers that meet this printer condition. The node addresses for these printers are "10.134.11.21," "10.134.11.22," "10.134.11.23," "10.134.11.24," "10.135.23.45," "10.135.23.46," "10.135.23.47," and "10.135.23.48." Accordingly, in the example of FIG. 12, these node addresses for the eight printers are associated with Notification Setting 1 in the recent data list. Further, the status and consumable data for each printer is extracted from the printer list and recorded in the recent data list. The first printer under Notification Setting 1 has the node address "10.134.11.21" and the status "Jam" and "Toner Low." The total number of printed pages is 25,161, while the remaining toner is 10%. The second printer has the node address "10.134.11.22" and the status "Normal." The total number of printed pages is 18,524, and the remaining toner is 20%.

Next, the previous data list stored in the previous data list storage area 184 will be described with reference to FIG. 13. The previous data list is used and updated during the status notification process. The time of error occurrence is entered during the status notification process, but is not entered when an error has not occurred, and is deleted when the error has been cleared. In the example shown in FIG. 13, the first printer listed under Notification Setting 1 has the node address "10.134.11.21," the status "Jam" and "Toner Low," the error occurrence times of 10:35 and 08:30, respectively, 25,161 printed pages, and 10% remaining toner. The second printer has the node address "10.134.11.22," the status "Normal," 18,521 printed pages, and 20% remaining toner. Because the status is "Normal", the time of error occurrence is not registered.

Next, the error occurrence notification mail list stored in the error occurrence notification mail list storage area 185 and the error recovery notification mail list stored in the error recovery notification mail list storage area 186 will be described with reference to FIGS. 14 and 15. These lists store data to be included in notification mail during the status notification process when the notification terminal device 1 determines that it is necessary to transmit error occurrence notification mail or error recovery notification mail. The example of FIG. 14 shows that an error occurrence notification mail indicating that a paper jam has occurred in the printer having the node address "10.134.11.21" is to be created, and an error occurrence notification mail indicating that a "Cover Open" error has occurred in the printer having the node address "10.135.23.46" is to be created, and an error occurrence notification mail indicating that a "Change Drum" error has occurred in the printer having the node address "10.135.23.48" is to be created. The example of FIG. 15 shows that an error recovery notification mail indicating that a "Change Drum" error in the printer having the node address "10.135.23.46" has been cleared is to be created.

A text sample for the error occurrence notification mail is shown in FIG. 16. The first and second lines in FIG. 16 are the text for the first error occurrence notification mail. This text notifies the user that a "Jam" error has occurred in the printer having the node address "10.134.11.21." The third and fourth lines in FIG. 16 are the text for the second error occurrence notification mail. This notification indicates that a "Cover Open" error has occurred in the printer having the node address "10.135.23.46."

Next, the status notification process executed by the notification terminal device 1 will be described with reference to FIGS. 17-22.

The status notification process begins when the Execute button 306 on the Manual Execution window in FIG. 6 is pressed or at a scheduled time set in the Schedule Setting window of FIG. 8. In this process, data for the printers 2 connected to the network 8 and managed by the notification terminal device 1 is obtained, and notification mail is transferred to the administrator based on preset notification settings when an error occurs or is cleared.

Figure 18:
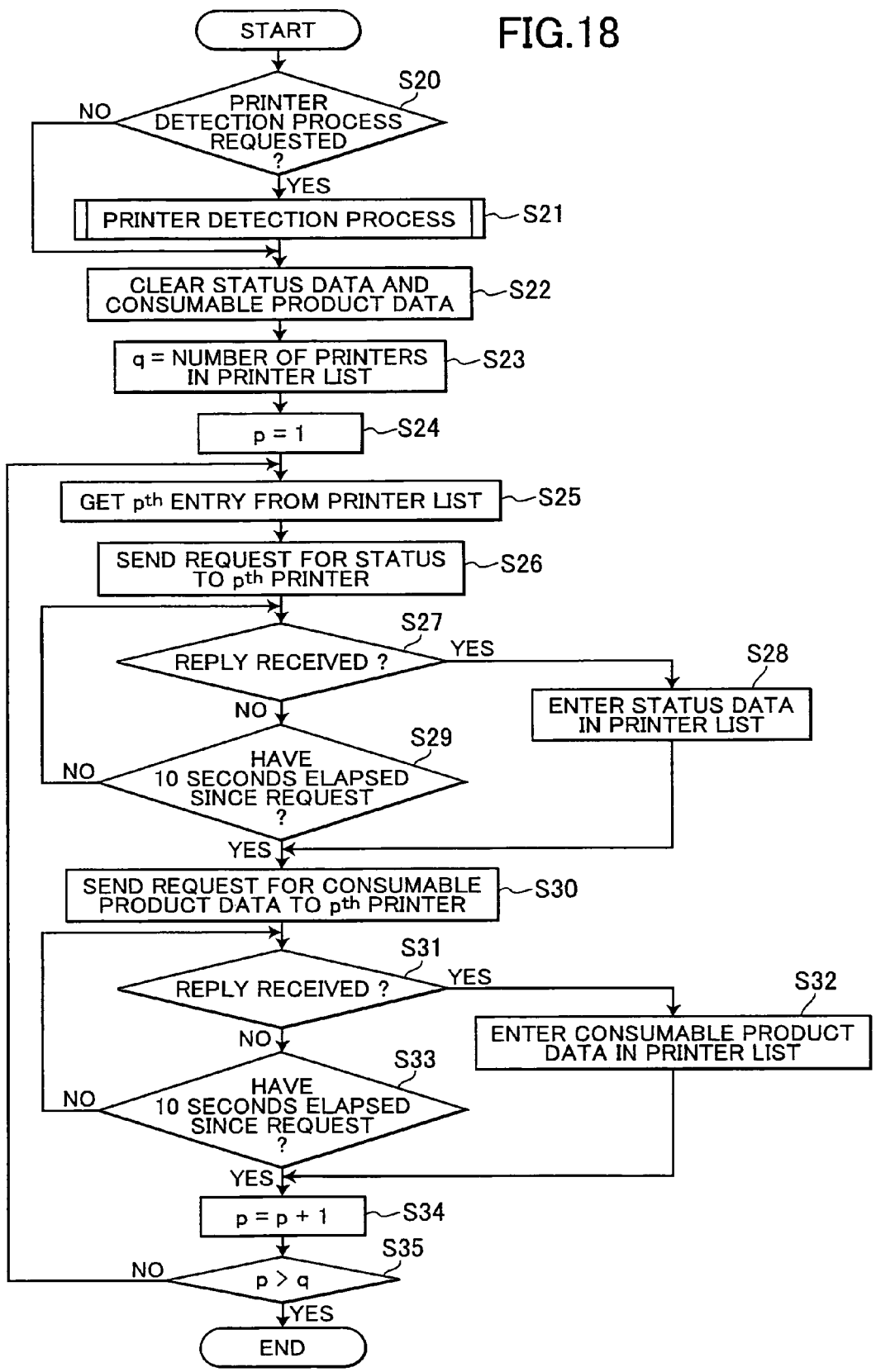
FIG. 18 is a flowchart representing a printer list updating process.
Figure 19:
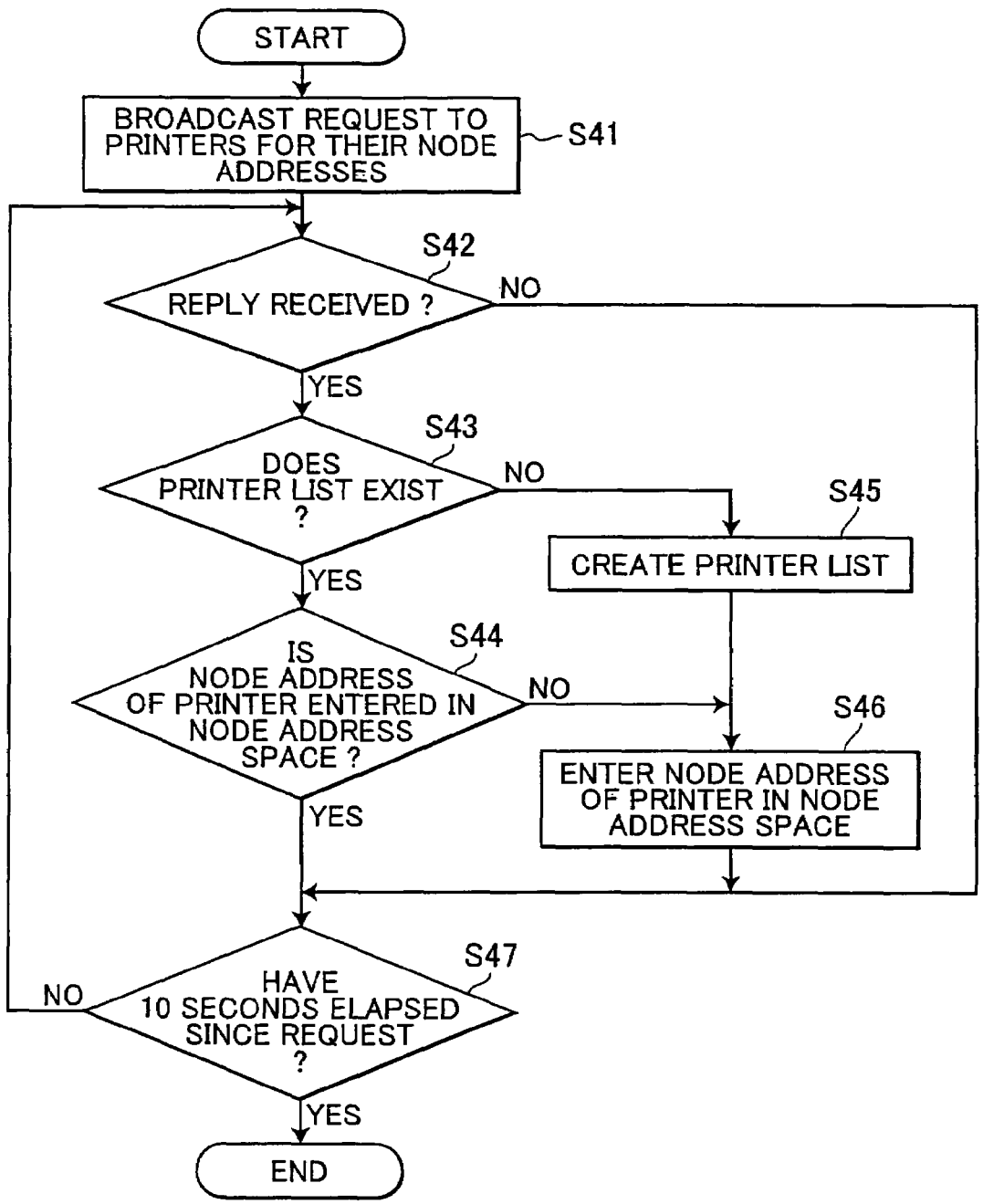
FIG. 19 is a flowchart representing a printer detection process.

In S1, a printer list updating process is executed. This printer list updating process will be described with reference to FIGS. 18 and 19. In S20 of FIG. 18, it is determined whether or not the printer detection process for detecting all of the printers 2 on the network 8 is requested. If a check box 305 (FIG. 6) has not been checked when the Execute button 306 is pressed or when current date and time do not match a scheduled printer detection event set in the Schedule Setting window of FIG. 8, then it is determined that the printer detection process is not requested (S20:NO), and the process skips to S22. On the other hand, if the check box 305 has been checked when the Execute button 306 is pressed or when the preset printer detection timing has arrived, then it is determined that the printer detection process is requested (S20:YES), and the printer detection process is executed in S21. FIG. 19 shows a flowchart representing the printer detection process.

In S41 of FIG. 19, request data is broadcasted to all printers 2 connected to the network 8, requesting the printers 2 to transmit their own node address data. In the example of FIG. 1, the notification terminal device 1 can directly transmit the request data to the printers 2a-2d connected to the same network 8a on which the notification terminal device 1 is connected, while each of the printers 2a-2d can transmit a reply with node address data directly to the notification terminal device 1. However, since the printers 2e-2j are connected to the networks 8b and 8c, the notification terminal device 1 cannot directly transmit the request data to these printers 2e-2j. Accordingly, the printer 2e serves as a probe device printer for broadcasting the request data to the printers 2f-2h on the network 8b. The printers 2f-2h transmit replies including their node address data to the printer 2e, and the printer 2e relays these replies to the notification terminal device 1. In the same manner, the printer 2i serves as a probe device printer for broadcasting the request data to the printer 2j on the network 8c. The printer 2j transmits a reply including its node address data to the printer 2i, and the printer 2i relays the reply to the notification terminal device 1. Accordingly, the notification terminal device 1 can manage not only the status of printers 2a-2d connected to its own network 8a, but also the status of printers 2e-2j connected to the other networks 8b, 8c. In this way, network costs can be reduced by eliminating the necessity to provide the notification terminal device 1 on each network. Further, the notification terminal device 1 stores the IP address and the like of the printers 2e and 2i in advance in order to perform communications with these probe devices.

In S42, it is determined whether or not a reply including node address data has been received from any of the printers 2. If a reply has not been received from any of the printers 2 (S42:NO), then the process skips to S47. On the other hand, if a reply has been received from any of the printers 2 (S42:YES), then in S43, it is determined whether or not a printer list is currently stored in the printer list storage area 182. If not (S43:NO), then a printer list is created in S45 for the first time. In S46, the node address for the printer 2 from which the reply was received is entered in the printer list, and the process advances to S47. On the other hand, if so (S43:YES), then it is determined in S44 whether or not the node address of the printer 2 that replied to the request is being entered in the printer list. If so (S44:YES), then the process advances to S47. On the other hand, if not (S44: NO), then in S46 the node address for the current printer 2 is entered in the printer list, and the process advances to S47.

In S47, it is determined whether or not ten seconds have elapsed since the request data was issued. If not (S47:NO), then the process returns to S42. If so (S47:YES), then the printer detection process ends, and process in FIG. 18 is resumed from S22.

In S22, the status data and consumable product data in the printer list are cleared. In S23, a printer number q is set to the total number of printers 2 registered in the printer list. In S24, a printer list counter p is set to 1. In S25, data (node address, status, consumable product data) for the $p^{th}$ printer 2 in the printer list is retrieved. In S26, request data is transmitted to $p^{th}$ the printer 2 having the retrieved node address, requesting the acquisition of status data. In S27, it is determined whether or not a reply has been received from the $p^{th}$ printer 2. If so (S27:YES), then in S28 the acquired status data is entered for the $p^{th}$ printer 2 in the printer list, and the process advances to S30. On the other hand, if a reply has not been received (S27:NO), then in S29, it is determined whether or not ten seconds have elapsed since the request data was issued. If not (S29:NO), then the process returns to S27. On the other hand, if ten seconds have elapsed (S29:YES), then the process advances to S30.

In S30, request data is transmitted to the $p^{th}$ printer 2, requesting consumable product data. In S31, it is determined whether or not a reply has been received from the printer 2. If so (S31:YES), then in S32 the consumable product data is entered in the consumable product data space for the $p^{th}$ printer of the printer list, and the process advances to S34. On the other hand, if a reply has not been received (S31:NO), then in S33, it is determined whether or not ten seconds have elapsed since the request data was issued. If not (S33:NO), then the process returns to S31. If so (S33:YES), then the process advances to S34, where the printer list counter p is incremented by 1. In S35, it is determined whether or not the printer list counter p is greater than the printer number q. If the printer list counter p is less than or equal to the printer number q (S35:NO), then the process returns to S25, and data (node address, status, and consumable produce data) for the $p^{th}$ printer 2 is acquired. On the other hand, if the printer list counter p is greater than the printer number q (S35:YES), then the printer list updating process ends, and the process proceeds to S2 in FIG. 17.

In S2, the recent data list (FIG. 12) stored in the recent data list storage area 183 is cleared. In S3, a notification setting number m is set to the number of notification settings listed in the notification settings list (FIG. 10) stored in the notification settings list storage area 181. In the example of FIG. 10, the notification setting number m is set to 3 (m=3). In S4, it is determined whether the notification setting number m is greater than 0. If the notification setting number m is not greater than 0 (S4:NO), then the process ends.

If the notification setting number m is greater than 0 (S4:YES), then in S5 a counter value n is set to 1. In S6, notification settings data for the $n^{th}$ notification setting is acquired from the notification settings list, and a recent data list creating process is executed for the $n^{th}$ notification setting.

The recent data list creating process will be described with reference to the flowchart of FIG. 20. In S50, a printer number q is set to the number of printers 2 listed in the printer list (FIG. 11). In S51, a counter value r is set to 1. In S52, data for the $r^{th}$ printer in the printer list is retrieved. In S53, it is determined whether or not the node address for the $r^{th}$ printer matches the printer condition of the $n^{th}$ notification setting. If so (S53:YES), then data for the rod printer including the node address data, status data, and consumable product data is entered into the recent data list (FIG. 12) in S54, and the process advances to S55. On the other hand, if the node address for the $r^{th}$ printer does not match the printer condition for the $n^{th}$ notification setting (S53:NO), then S54 is skipped and the process advances to S55. For example, if n=2 and r=4 in the example shown in FIGS. 10 through 12, the node address for the r=$4^{th}$ printer in the printer list is "10.134.11.24." The printer condition for the n=$2^{nd}$ notification setting in the notification settings data list is "110.134.*.*". Since "10.134.*.*" includes "10.134.11.24," a positive determination is made in S53, and the node address "10.134.11.24," the status of "Normal," the printed-page number of 1,321, and the remaining toner of 80% are recorded in the recent data list.

In S55, the counter value r is incremented by 1. In S56, it is determined whether or not the counter value r is greater than the printer number q. If the counter value r is not greater than the printer number q (S56:NO), then the process returns to S52, and the processes of S52 to S54 are repeated for the $r^{th}$ printer. On the other hand, if the counter value r is greater than the printer number q (356:YES), then the recent data list is fixed and written to the recent data list storage area 183 of the hard disk drive 18 in S57. In S58, a variable s is set to the number of printers 2 recorded in the recent data list. Then, the recent data list creating process ends, and the process proceeds to S8 of FIG. 17.

In S8, it is determined whether or not a previous data list for the $n^{th}$ notification setting is being stored in the previous data list storage area 184. If not (S8:NO), then an error occurrence process is executed in S11. On the other hand, if so (S8:YES), then the previous data list is retrieved in S9, an error recovery process is executed in S10, and then the error occurrence process is executed in S11. The error recovery process and the error occurrence process are described below. In S12, the counter value n is incremented by 1. In S13, the counter value n is compared to the notification setting number m. If the counter value n is not greater than the notification setting number m (S13:NO), then the process returns to S6. On the other hand, if the counter value n is greater than the notification setting number m (S13:YES), then the process ends.

Figure 21:
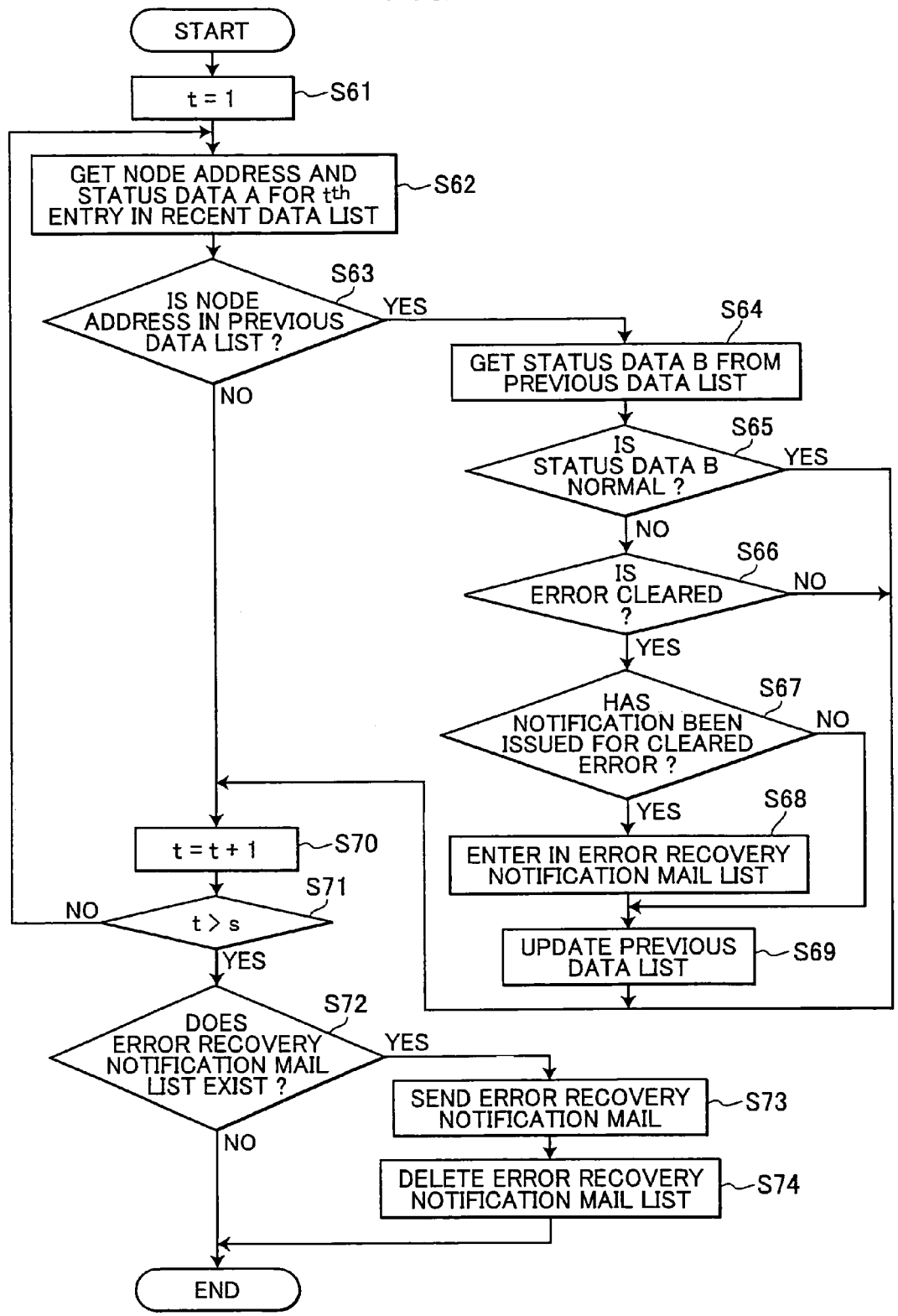
FIG. 21 is a flowchart representing an error recovery process.

Next, the error recovery process executed in S10 will be described with reference to the flowchart of FIG. 21. In S61, a counter value t is set to 1. In S62, the node address and status data for the $t^{th}$ printer in the $n^{th}$ notification setting in the recent data list is acquired. The acquired status data is set as a status data A. In S63, it is determined whether or not the acquired node address is currently entered in the previous data list. If not (S63:NO), then the process advances to S70. If so (S63:YES), then in S64, status data for the $t^{th}$ printer is acquired from the previous data list. This status data is set as a status data B. In S65, it is determined whether or not the status data B is "Normal." If so (S65:YES), then the process advances to S70. If not (S65:NO), then in S66 it is determined whether or not the error in the printer 2 has been cleared. Here, it is determined that the error has not been cleared when the status data A includes all of the status data B, and determined that the error has been cleared when the status data A does not include one or more of the status data B. For example, if the status data A is "Normal" and the status data B is "Toner Low," then the status data A does not include the status data B of "Toner Low", so that it is determined that the "Toner Low" error has been resolved. If the status data A is "Toner Low" and the status data B is "Toner Low" and "Cover Open," then the status data A does not include the "Cover Open" of the status data B. This indicates that the "Cover Open" error has been resolved. However, when both the status data A and B are "Toner Low" or when the status data A is "Toner Low" and "Cover Open" and the status data B is "Toner Low," for example, then this means that the error has not been resolved.

If it is determined that the error has not been cleared (S66:NO), the process advances to S70. If it is determined that the error has been cleared (S66:YES) then in S67 it is determined whether or not an error occurrence notification has been issued for the cleared error. This determination is made by detecting whether the set notification conditions have been met. For example, when the corresponding notification frequency is set to "every time," while the notification interval is twenty minutes, and the time that the error occurred (FIG. 13) is 10:35, then the notification condition has been met if the current time is later than 10:55 which is twenty minutes after 10:35, and so it is determined that an error occurrence notification has been issued.

If it is determined that an error occurrence notification has been issued (S67:YES), then in S68 the node address and the status data B (only the error among the status data B that is determined to have been cleared when there are a plurality of errors in the status data B) for the $t^{th}$ printer 2 are recorded in the error recovery notification mail list (FIG. 15). In S69, the status data B of the previous data list is updated, and the time of error occurrence is deleted. More specifically, when all errors in the status data B have been cleared, the status data is overwritten with "Normal." However, if only a portion of the errors included in the status data B have been cleared, then data corresponding to the cleared error is deleted from the status data. Subsequently, the process advances to S70. On the other hand, if it is determined in S67 that the error occurrence notification has not been issued (S67:NO), then the process skips S68 and advances to S69.

For example, if n=1 and t=6, in the n=$1^{st}$ notification setting 1 of the recent data list in FIG. 12, the t=$6^{th}$ node address is "10.135.23.46." The printer status corresponding to this node address is "Cover Open." Accordingly, the status data A is set to "Cover Open" in S62. The node address "10.135.23.46" is being listed in $6^{th}$ position under the n=$1^{st}$ Notification Setting 1 in the previous data list of FIG. 13 (S63:YES). Since this status is "Cover Open" and "Change Drum," the status data B is set to "Cover Open" and "Change Drum" in S64. Since the status data B is not "Normal" (S65:No), and status "Change Drum" of the status data B is not included in the status data A, it is determined that the status "Change Drum" has been cleared (S66:YES). In S67, assuming that the current time is 10:38, a positive determination is made (S67:YES). In S68, the node address and the status "Change Drum" are entered in the error notification mail list. In S69, in the previous data list of FIG. 13, the status data B is overwritten with "Cover Open," and time of error occurrence "10:16" for the status "Change Drum" is erased Subsequently, the process advances to S70.

In S70, the counter value t is incremented by 1. In S71, the counter value t is compared to the variable s. If the counter value t is not greater than the variable s (S71:NO), then the process returns to S62, and the processes in S63-S69 are repeated for the to printer. However, if the counter value t is greater than the variable s (S71:YES), then in S72 it is determined whether or not the error recovery notification mail list exists. If the error recovery notification mail list does not exist (S72:NO), then the process ends. On the other hand, if so (S72:YES), then in S73 an error recovery notification mail is transmitted to the mail addresses entered in the $n^{th}$ notification setting registered in the notification settings list. In S74, the error recovery notification mail list is deleted, and the process ends.

Figure 22:
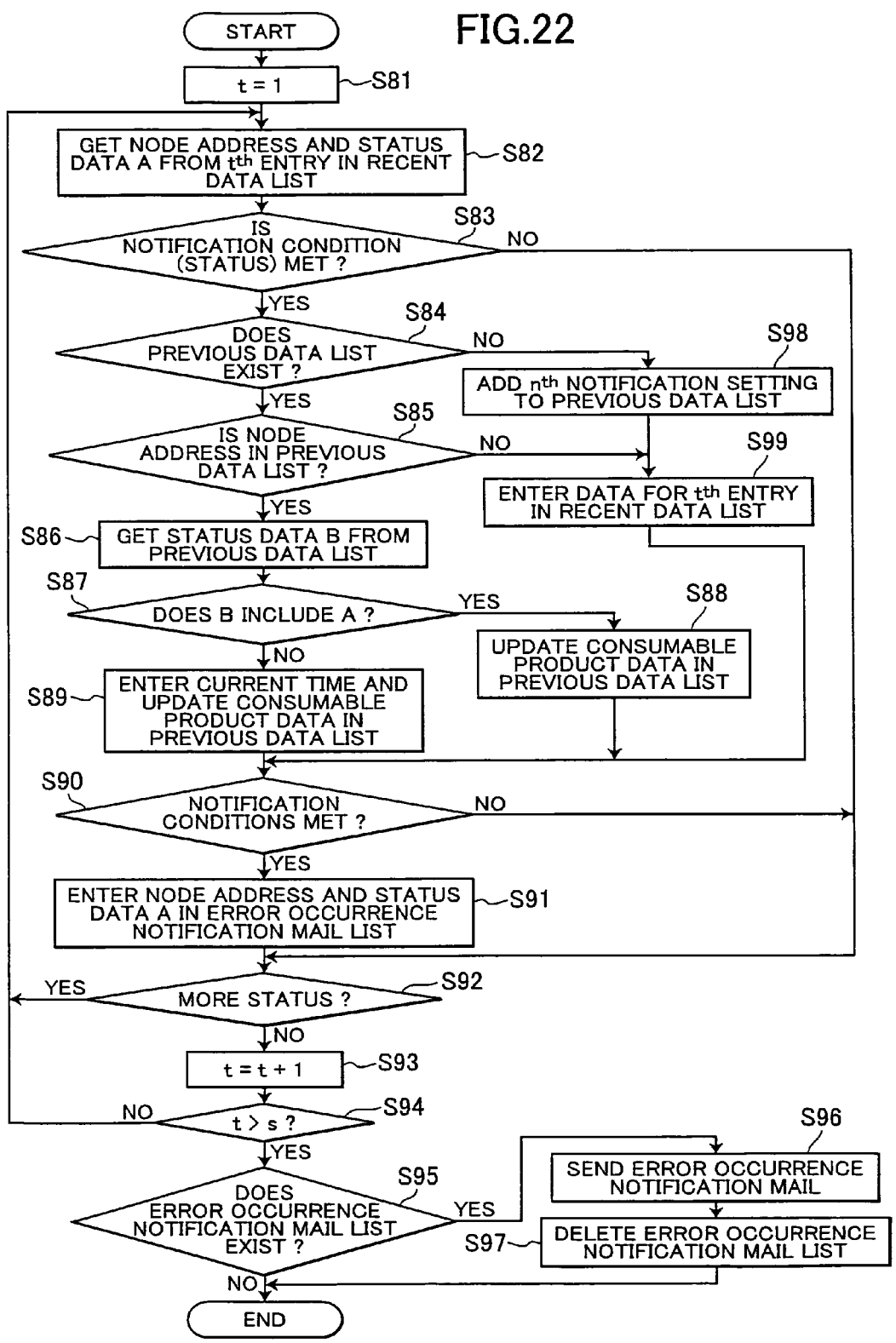
FIG. 22 is a flowchart representing an error occurrence process.

Next, the error occurrence process executed in S11 will be described with reference to the flowchart of FIG. 22. In S81, a counter value t is set to 1. In S82, the node address and status data for the $t^{th}$ printer in the $n^{th}$ notification setting are acquired from the recent data list. Here, if the $t^{th}$ printer has a plurality of status data, one of the status data is obtained. This status data is set as a status data A. Next, in S83, it is determined whether or not the status data A satisfies the notification conditions (status) of the $n^{th}$ notification setting with reference to the notification settings list (FIG. 10). If not (S83:NO), then notification is unnecessary and the process advances to S92. On the other and, if so (S83:YES), then in S84 it is determined whether or not the $n^{th}$ notification setting exists in the previous data list. If not (S84:NO), then the process advances to S98, where the $n^{th}$ notification setting is added to the previous data list. In S99, the node address, status, and consumable product data (number of print pages and remaining toner) for the $t^{th}$ printer in the recent data list are recorded in the previous data list, and also the present time is recorded as the time of error occurrence. Then, the process advances to S90. On the other hand, if the $n^{th}$ notification setting already exists in the previous data list (S84:YES), then in S85, it is determined whether or not the node address of the $t^{th}$ printer is being entered in the previous data list. If not (S85:NO), then the process advances to S99. If so (S85:YES), then in S86, the status data of the $t^{th}$ printer is retrieved from the previous data list. This status data is set as a status data B. In S87, it is determined whether the status data B includes the status data A. If the status data B includes the status data A (S87:YES), this indicates that the error is still in effect from the previous time, then in S88 the consumable product data recorded in the previous data list is updated, and the process advances to S90. On the other hand, if the status data B does not include the status data A (S87:NO), then in S89, the consumable product data in the previous data list is updated by entering the status data A and the current time as the time of error occurrence for the $t^{th}$ printer. Then, the process advances to S90.

In S90, it is determined whether the notification frequency and interval in the notification conditions have been met for the relevant status A. For example, if the notification frequency is "only once" and the notification interval is 0 minutes, and if the current time is 0 minutes after the time of error occurrence entered in the previous data list, then the notification terminal device 1 determines that the notification conditions are met. Further, if the notification frequency is "every time" and the notification interval is 3 minutes, and if the current time is 3n (n=1, 2, 3, . . . ) minutes after the time of error occurrence in the previous data list, then it is determined that the notification conditions have been met. If a negative determination is made in S90 (S90:NO), then the process skips to S92. If a positive determination is made in S90 (S90:YES), then in S91 the relevant node address and status data A of the $t^{th}$ printer are added to the error occurrence notification mail list (FIG. 14), and the process advances to S92.

In S92, the notification terminal device 1 determines whether any unprocessed status data exists in the $t^{th}$ entry of the $n^{th}$ notification setting from the recent data list. If so (S92:YES), the process returns to S82, and the above described processes are repeated for the next status data. If not (S92:NO), then the process proceeds to S93.

A concrete example of this process will be described while referring to the examples in FIGS. 10, 12 and 13. By assuming that n=1 and t=1, the node address for the t=$1^{st}$ printer in the n=$1^{st}$ notification setting is "10.134.11.21" and the status for the printer is "Jam" and "Toner Low" in FIG. 12. Accordingly, the status data A is set to "Jam" in S82. By referencing FIG. 10, it can be seen that "Jam" is being listed as the notification status for the n=$1^{st}$ notification setting. Accordingly, the status data A "Jam" satisfies the notification condition (S83:YES). In this example, a previous data list already exists (S84:YES) and the node address "10.134.11.21" is recorded in the $1^{st}$ entry of the previous data list for the n=$1^{st}$ notification setting of FIG. 13 (S85: YES). Since the status of the $1^{st}$ printer is "Jam" and "Toner Low," the status data B is set to "Jam" and "Toner Low" in S86. Since the status data B includes the status data A (S87:YES), the consumable product data in the previous data list is updated in S88. In FIG. 10, the notification frequency for the status "Jam" in the n=1$^{st}$ notification setting is "every time" and the notification interval is set to 1 minute. Since the time of error occurrence was 10:35 and the current time of 10:38 is 1×n (n=2) minutes after 10:35, the notification conditions are met (S90:YES). In S91, the node address "10.134.11.21" and the status "Jam" are recorded in the error occurrence notification mail, and the process advances to S92. Because there is unprocessed status "Toner Low" for the t$^{th}$ printer, a positive determination is made in S92 (S92:YES), and the process returns to S82.

In S93, the counter value t is incremented by 1. In S94, it is determined whether or not the counter value t is greater than the variable s. If the counter value t is not greater than the variable s (S94:NO), then the process returns to S82, and the above processes are repeated for the t$^{th}$ printer. On the other hand, if the counter value t is greater than the variable s (S94:YES), then in S95, it is determined whether or not the error occurrence notification mail list exists. If not (S95:NO), then the process ends. If so (S95:YES), then in S96, an error occurrence notification mail such as that shown in FIG. 16 is transmitted to the mail address for the n$^{th}$ notification setting. In S97, the error occurrence notification mail list is deleted, and the process ends.

As described above, a plurality of the printers 2 connected to the network 8 can be grouped according to node address in the network terminal device status notifying system according to the present embodiment. The notification destination for the error occurrence status and error recovery status of the printers 2 and notification conditions and other settings can be established for each group. It is further possible to transmit error occurrence notification mail and error recovery notification mail regarding the printers 2 to the personal computers 3 serving as the notification terminal device based on the notification settings established for each group.

Hence, the network administrator need not establish notification settings for each printer, but can establish settings for each group. Accordingly, when a new network is constructed, the administrator need only establish settings for the number of groups, thereby giving the administrator less burden than when having to set notification settings for each printer. When a printer is added to the network, the administrator need only indicate to which group the printer belongs, thereby not only reducing the administrator's workload, but also avoiding mistakes in settings. Further, the notification terminal device 1 does not issue notifications to users for all printers connected to the network, but only data for printers necessary to the user.

The user can also set condition for which notifications of the printers' status are issued. Accordingly, it is possible to issue notifications to the user only for status data based on user-defined conditions.

Further, if a plurality of errors occur or if a plurality of errors are cleared during a single status notifying process, notification mail can be created for each established group, rather than for each printer, thereby preventing multiple notification mail messages from being transmitted to recipient.

Next, a modification of the present embodiment will be described. In the embodiment described above, data for all printers 2 on the network 8 is first gathered, and a printer list is created as shown in FIG. 11. In the this modification, however, only data for printers 2 to be monitored is collected, and a targeted printer list is created. For example, if 100 printers 2 exist on a network 8, but only 5 printers 2 are to be monitored, then the process of extracting data for a total of 95 printers 2 can be eliminated, thereby increasing the efficiency of the process. More specifically, a printer list updating process described next based on the flowchart in FIG. 23 is executed in place of the printer list updating process described above in S1 of FIG. 17 and the flowchart of FIG. 18.

Figure 23:
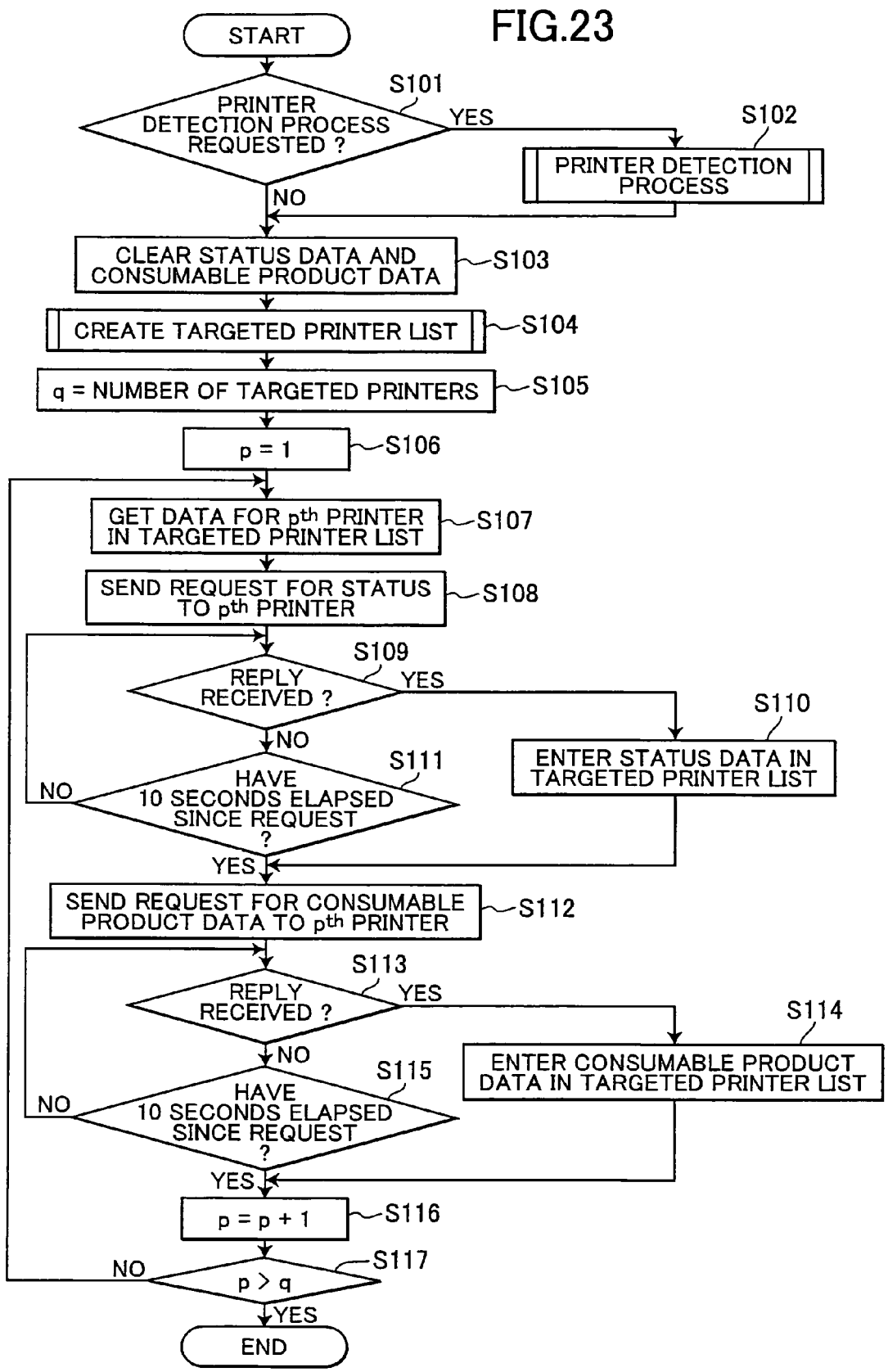
FIG. 23 is a flowchart representing a printer list updating process according to a first modification of the present embodiment.
Figure 24:
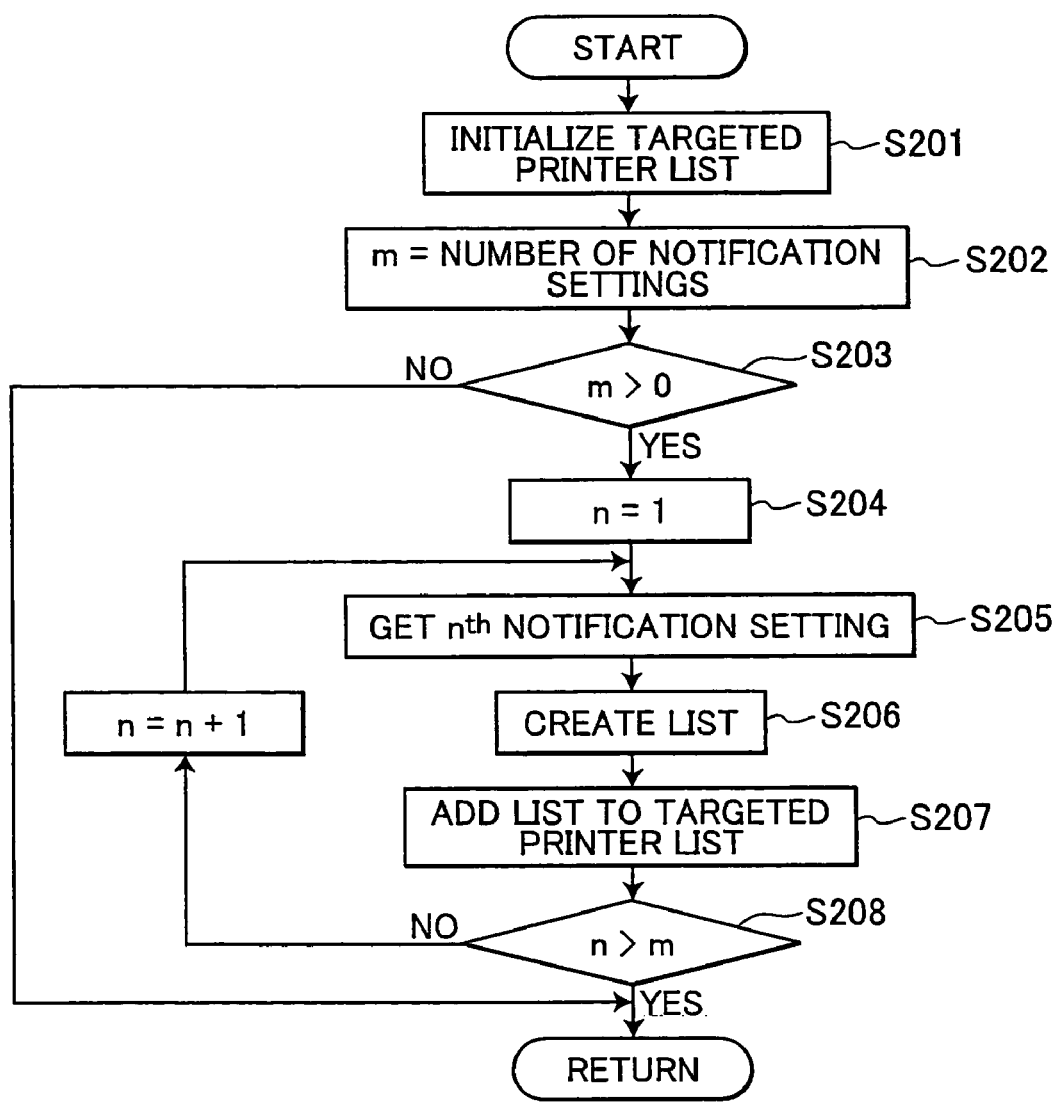
FIG. 24 is a flowchart representing a targeted printer list preparation process executed in S104 of FIG. 23.

In S101 of FIG. 23, it is determined whether the printer detection process is requested. If so (S101:YES), then the above printer detection process shown in FIG. 19 is executed in S102, and the process advances to S103. If not (S101:NO), then the process skips S102 and advances directly to S103. In S103, the status and consumable product data in a targeted printer list are deleted. In S104, a targeted printer list preparation process is executed. FIG. 24 is a flowchart representing the targeted printer list preparation process. In S201, the targeted printer list is initialized. In S202, a notification setting number m is set to the number of notification settings listed in the notification settings list (FIG. 10) that is stored in the notification settings list storage area 181. In S203, it is determined whether or not the notification setting number m is greater than 0. If the notification setting number m is not greater than 0 (S203:NO), then the process ends. On the other hand, if the notification setting number m is greater than 0 (S203:YES), then in S204, a counter value n is set to 1. In S205, data for the n$^{th}$ notification setting is acquired from the notification settings list (FIG. 10). In S206, printers matching the printer condition of the n$^{th}$ notification setting are extracted from the printer list. In S207, the extracted printers are added to the targeted printer list. In S208, it is determined whether or not the counter value n is greater than the notification setting number m. If not (S208:NO), then the counter value n is incremented by 1 in S210, and the process returns to S205. On the other hand, if so (S208:YES), then the process ends.

Returning to the process of FIG. 23, in S105, a printer number q is set to the number of printers listed in the targeted printer list. In S106, a printer list counter p is set to 1. In S107, data for the p$^{th}$ printer is acquired from the targeted printer list. In S108, request data is transmitted to the pet printer having the acquired node address, requesting status data. In S109, it is determined whether a response has been received from the printer. If a response has been received (S109:YES), then in S110, the acquired status data is entered for the p$^{th}$ printer in the targeted printer list, and the process advances to S112. On the other hand, if no reply has been received (S109:NO), then it is determined whether ten seconds have elapsed since request data was issued. If not (S111:NO), then the process returns to S109. If so (S111:YES), then the process advances to S112.

In S112, request data is transmitted to the p$^{th}$ printer, requesting consumable product data. In S113, it is determined whether a reply has been received from the printer. If a reply has been received (S113:YES), then in S114, the consumable product data is entered for the p$^{th}$ printer in the targeted printer list, and the process advances to S116. On the other hand, if a reply has not been received (S113:NO), then in S115, it is determined whether ten seconds have elapsed since the request data was issued. If not (S115:NO), then the process returns to S113. If so (S115:YES), then the process advances to S116. In S116, the printer list counter p is incremented by 1. In S117, it is determined whether or not the printer list counter p is greater than the printer number q. If not (S117:NO), then the process returns to S107. If the printer list counter p is greater than the number printer q (S117:YES), then the process ends.

Here, the reason for determining whether a printer detection process is requested will be described. Since a network structure does not change frequently in reality, it is sufficient to perform the printer detection process only when needed or at relatively long intervals. Hence, the printer detection process is executed only when a detection process is indicated by user operations or when a prescribed timing is detected by an internal time.

Next, a second modification of the present embodiment will be described. In the embodiment described above, status data received from each printer 2 is recorded directly in a recent data list as the printer status. However, in the present variation, the notification terminal device 1 evaluates and determines the status of the printers 2 based on the consumable product data and data concerning other printer operations acquired from the printers 2 and records this status in the recent data list.

Figure 20:
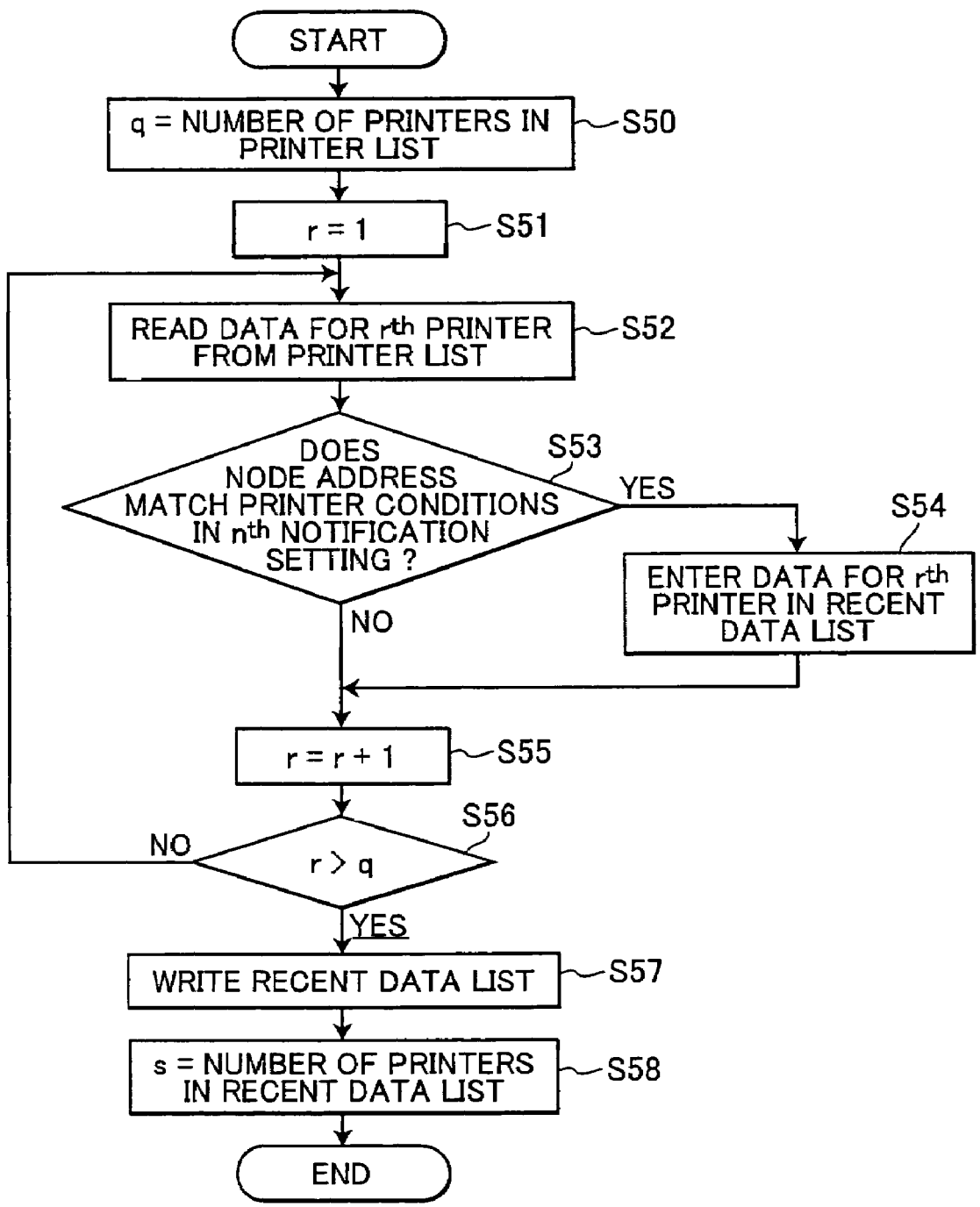
FIG. 20 is a flowchart representing a recent data list creating process.
Figure 25:
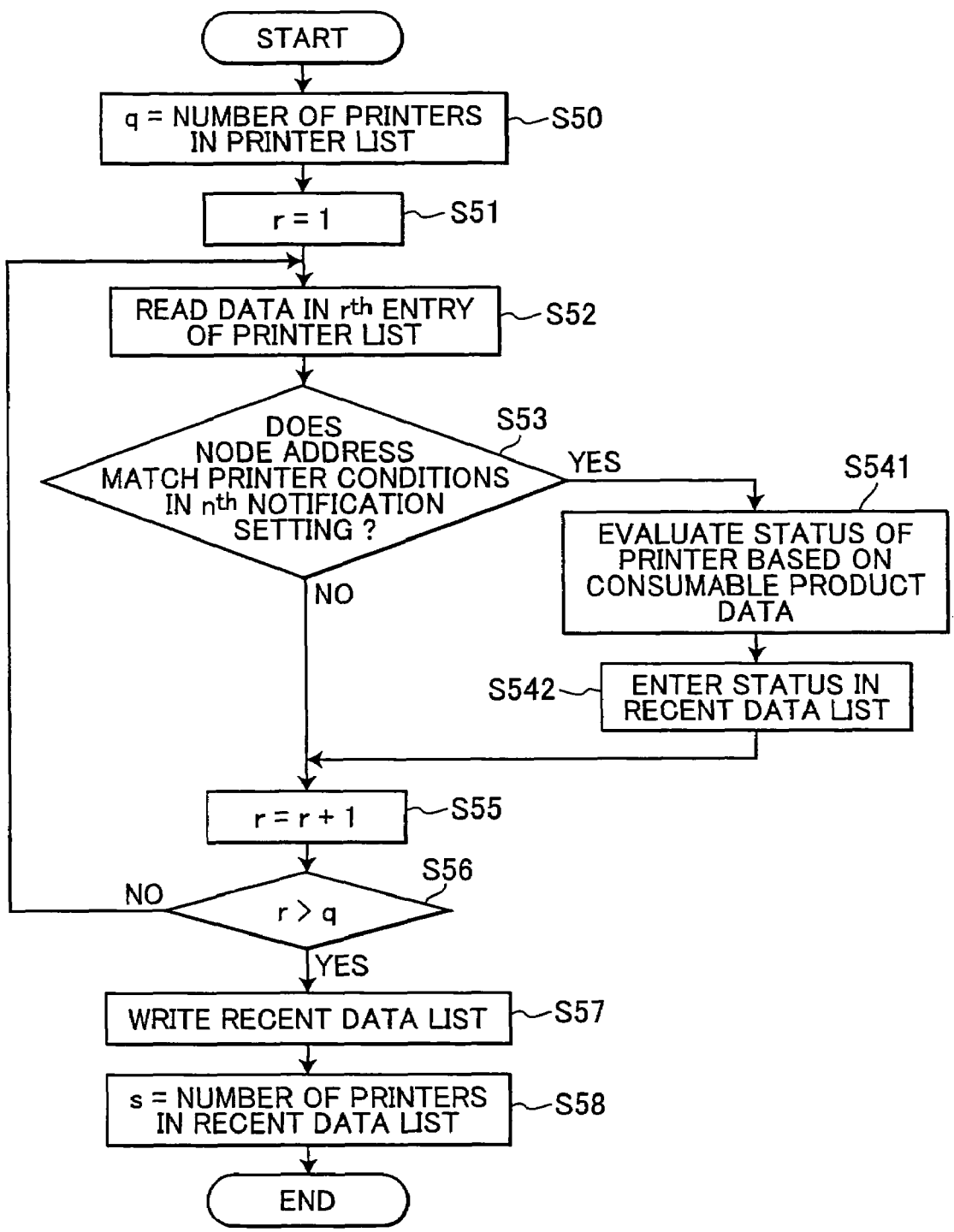
FIG. 25 is a flowchart representing an error recovery process according to a second modification of the present embodiment.

FIG. 25 is the flowchart representing this process, which is essentially identical to the flowchart of FIG. 20. However, in place of the entry process of S54 in FIG. 20, the notification terminal device 1 evaluates the status of the printer 2 in S541 based on consumable product data and the like and records this status in the recent data list in S542.

While some exemplary embodiments of this invention have been described in detail, those skilled in the art will recognize that there are many possible modifications and variations which may be made in these exemplary embodiments while yet retaining many of the novel features and advantages of the invention.

For example, the above embodiment employs a printer as the network terminal device. However, the present invention is not limited to a printer. A scanner, a facsimile device, or other network terminal device may be used.

Further, in the embodiment described above, the node address was used for grouping network terminal devices. However, grouping conditions can also be based on a Mac address, type of network terminal device, manufacturing company of the network terminal device, name of the network terminal device, and the like. It is also possible to use both the node address and type of network terminal device as conditions, or to set a plurality of other conditions. Moreover, notification settings can be set for each one of the printers, but not for each one of the printer groups, by using the node address of the printer.

It is also possible to save one or more of the notifications settings list (FIG. 10), the printer list (FIG. 11), the recent data list (FIG. 12), and the previous data list (FIG. 13) as file data by pressing a status memorize button 310 (FIG. 5). Alternatively, it is possible to save one or more of these lists automatically as log data.

What is claimed is:

1. A notifying system comprising:
a plurality of network terminals; and
a notification terminal that is connected to the network terminals via a network;
wherein each of the network terminals includes a status transmitting unit that transmits status data to the notification terminal, the status data indicating a status of the network terminal; and
the notification terminal includes:
a receiving unit that receives the status data;
a setting unit that sets a notification condition and a destination user;
a determining unit that determines whether the status of the network terminal meets the notification condition;
a notifying unit that notifies the destination user of the status when the determining unit determines that the status meets the notification condition; and
a memory that stores historical data representing previous status of each network terminal and a comparing unit that compares the historical data with the status data, and the determining unit determines whether the status meets the notification condition based on the comparison results by the comparing unit.

2. The notifying system according to claim 1, wherein the setting unit sets a notification condition and a destination user for each of a plurality of groups of the network terminals.

3. The notifying system according to claim 2, wherein the setting unit establishes groups of network terminals based on at least one of node address, node name, model name, manufacturer name, terminal name, and location of the network terminals.

4. The notifying system according to claim 1, wherein the status data includes a consumable products data indicating status of consumable products used in the network terminal.

5. The notifying system according to claim 1, wherein the notifying unit notifies the destination user by transmitting a notification, the notification indicating the status of two or more of the network terminals.

6. The notifying system according to claim 1, further comprising:
a first network to which the notification terminal is connected;
a second network connected to and different from the first network; and
a probe device connected to the second network, the probe device including a requesting unit that issues a request to at least one of the plurality of network terminals connected to the second network, requesting to transmit the status data, wherein
the transmitting unit of each of the network terminals transmits the status data in response to the request.

7. The notifying system according to claim 1, wherein the notification terminal further includes:
an extracting unit that periodically extracts the existence of network terminals by multicasting; and
a status data requesting unit that issues a request to the network terminals whose existence have been extracted by the extracting unit, the request requesting the status data.

8. The notifying system according to claim 1, further comprising a user terminal connected to the notification terminal via the network, wherein the notifying unit of the notification terminal notifies the destination user of the status through the user terminal.

9. The notifying system according to claim 1, wherein the setting unit sets a notification condition for each of a plurality of status types.

10. The notifying system according to claim 9, wherein the determining unit determines whether the status of the network terminal meets the corresponding notification condition, and the notifying unit notifies the destination user of the status when the determining unit determines that the status meets the corresponding notification condition.

11. The notifying system according to claim 1, wherein the notification terminal further includes:
a first list unit that creates a first list listing the notification condition and the destination user;
an extracting unit that periodically extracts the existence of network terminals by multicasting;

a second list unit that creates a second list listing the extracted network terminals;

a third list unit that creates a third list listing the current status of each network terminal;

a memory that stores a historical data list listing previous status of each network terminal; and a saving unit that saves one or more of the first list, the second list, the third list, and the historical data list as file data.

12. The notifying system according to claim 1, wherein:

the notification terminal further includes a memory that stores the notification condition set by the setting unit;

the receiving unit receives the status data via the network; and the determining unit determines whether the status of the network terminal indicated by the status data received via the network meets the notification condition stored in the memory.

13. A notification terminal capable of communicating with a plurality of network terminals and a user terminal via a network, the notification terminal comprising:

a receiving unit that receives status data indicating status of the network terminals from the network terminals;

a setting unit that sets a notification condition and a destination user;

a determining unit that determines whether the status meets the notification condition;

a notifying unit that notifies the destination user of the status when the determining unit determines that the status meets the notification condition; and a memory that stores historical data representing previous status of each network terminal and a comparing unit that compares the historical data with the status data, and the determining unit determines whether the status meets the notification condition based on the comparison results by the comparing unit.

14. The notification terminal according to claim 13, wherein the notifying unit notifies the destination user of the status through the user terminal.

15. The notification terminal according to claim 13, further comprising a memory that stores the notification condition set by the setting unit, wherein:

the receiving unit receives the status data from the network terminals via the network, the status data indicating status of the network terminals; and the determining unit determines whether the status indicated by the status data received via the network meets the notification condition stored in the memory.

16. A notifying system comprising:

a plurality of network terminals;

a notification terminal that is connected to the network terminals via a network; and an informing terminal that is connected to the notification terminal via the network wherein each of the network terminals includes a status transmitting unit that transmits status data to the notification terminal in response to request data that is transmitted at a regular interval from the notification terminal, the status data indicating a status of the network terminal;

wherein the notification terminal includes:

a requesting unit that transmits the request data at the regular interval to each of the network terminals;

a status receiving unit that receives the status data;

a user setting unit that sets a destination user;

an output unit that outputs a notification;

a memory that stores the status of each of the network terminals indicated by the status data received by the status receiving unit, the memory storing the status as a first status;

a selecting unit that selects at least one of predetermined statuses;

a frequency setting unit that sets frequency for each status selected by the selecting unit;

a determining unit that determines, when the status receiving unit receives next status data from one of the network terminals, whether the first status of the one of the network terminals stored in the memory is the same as a second status indicated by the next status data transmitted from the one of the network terminals; and a control unit that controls the output unit, the control unit controlling the output unit to output the notification when the determining unit determines that the first status differs from the second status and when the second status has been selected by the selecting unit, the notification indicating the second status and being output for the destination user associated with the second status; and the control unit controls the output unit to output the notification with the frequency set for the second status set by the frequency setting unit when the determining unit determines that the first status is the same as the second status and when the second status has been selected by the selecting unit; and wherein the informing terminal includes:

a notification receiving unit that receives the notification from the notification terminal; and an informing unit that provides information to the destination user based on the notification received by the notification receiving unit.

17. The notifying system according to claim 16, wherein the network terminals are printers.

* * * * *